May 12, 1953

C. R. HANNA 2,638,288

CONTROL SYSTEM FOR CRAFT OPERABLE IN SPACE

Filed Nov. 14, 1947

WITNESSES:
Robert C. Baird
E. F. Oberheim

INVENTOR
Clinton R. Hanna.
BY
Paul E. Friedemann
ATTORNEY

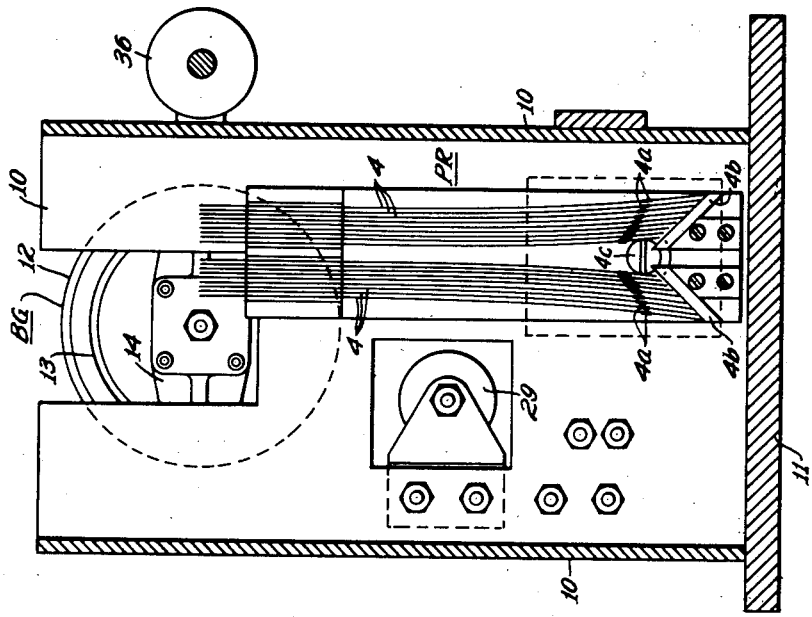
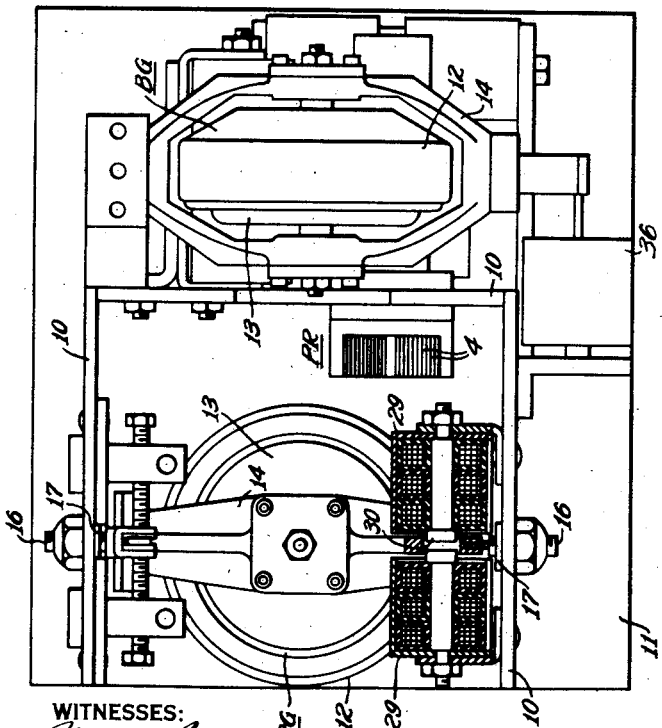
Fig. 3.
Fig. 2.
INVENTOR
Clinton R. Hanna

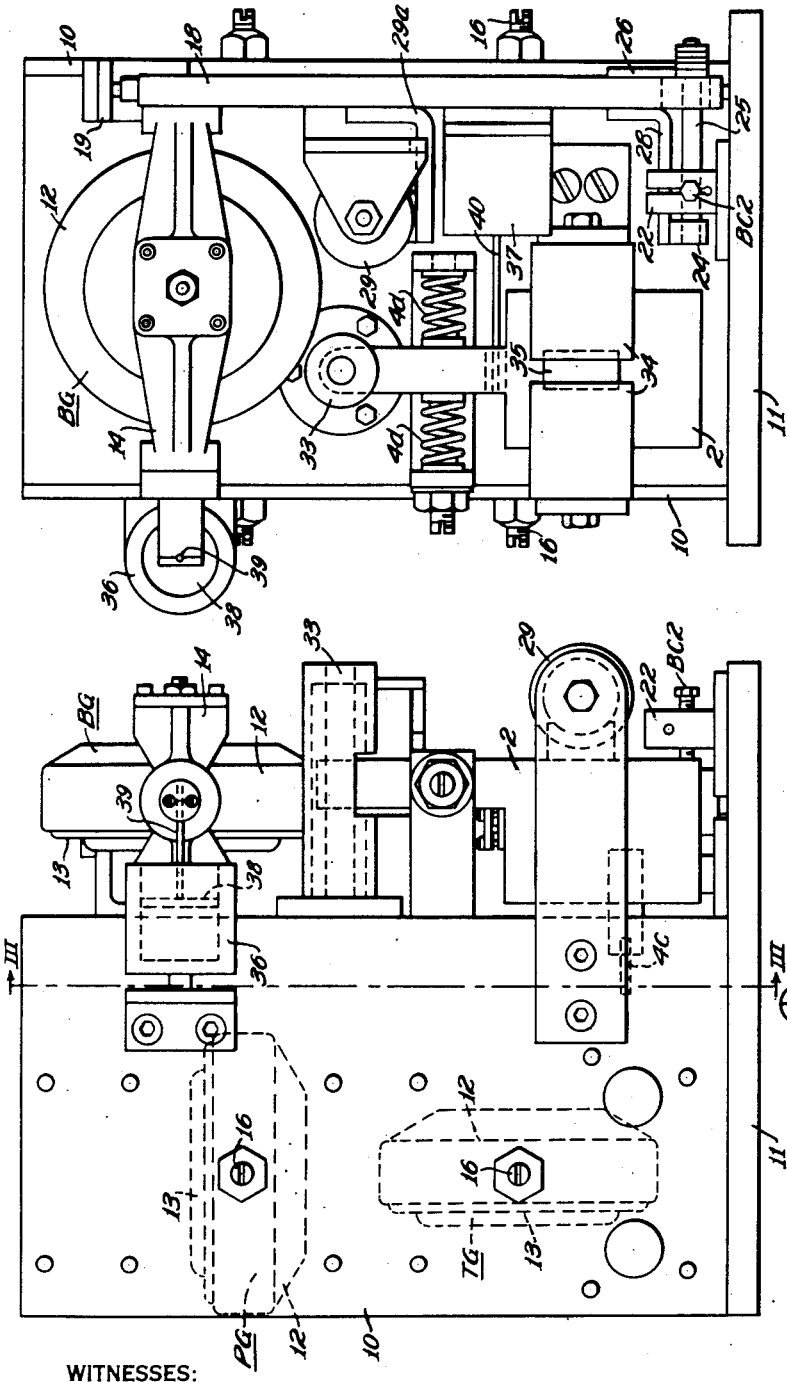

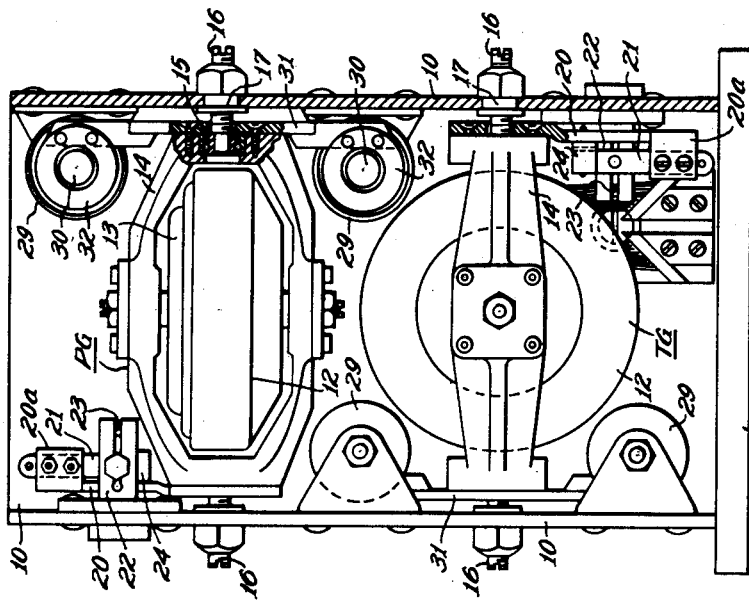
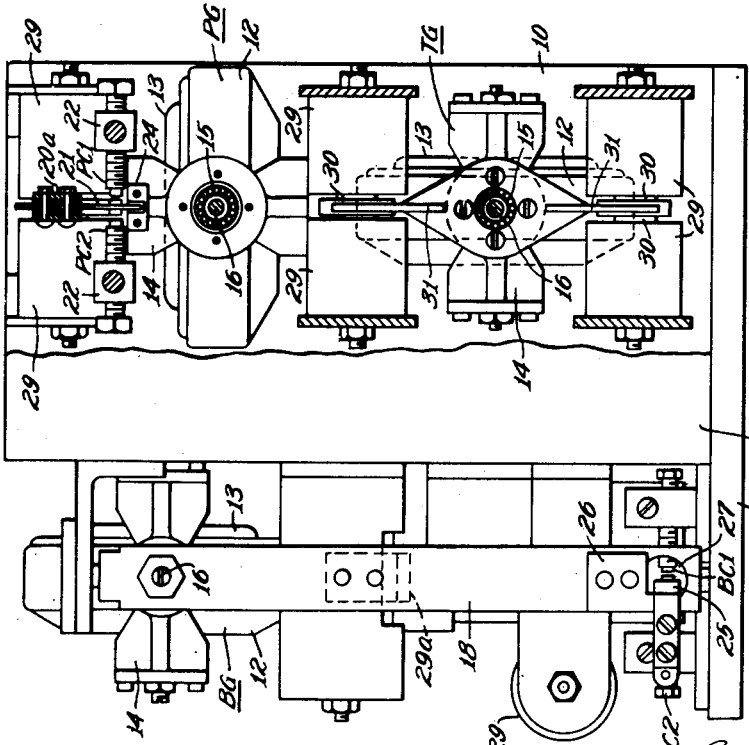

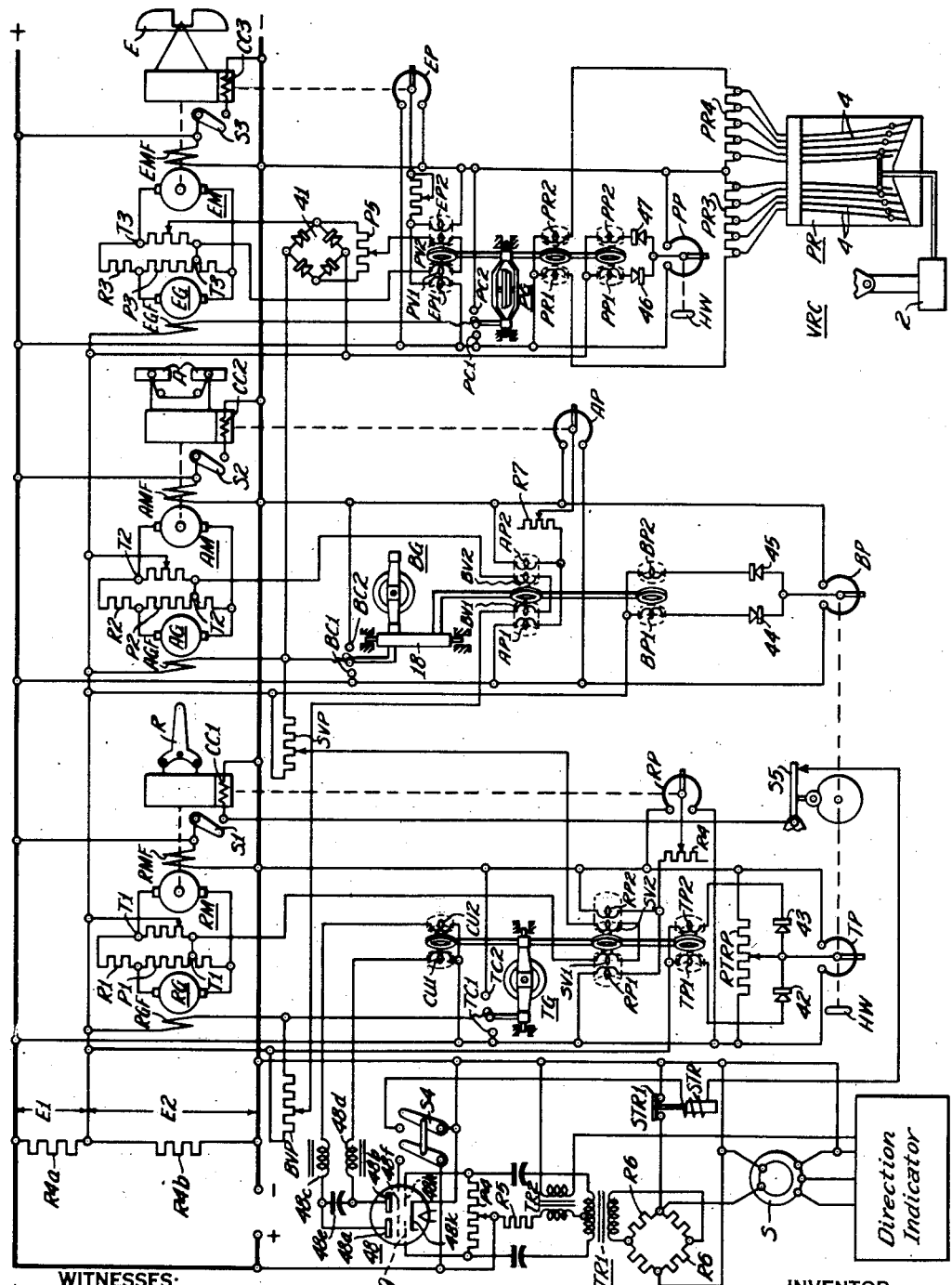

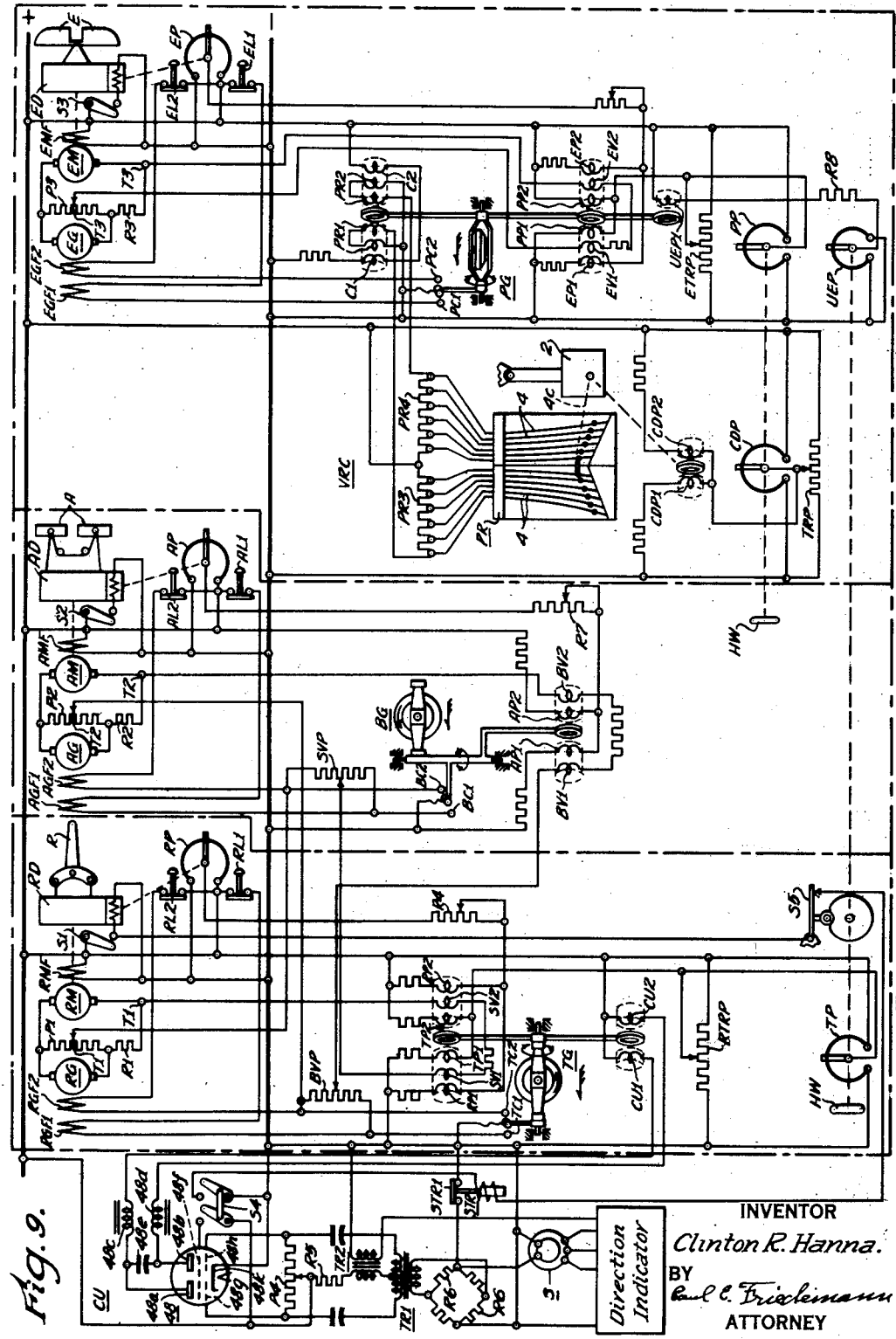

May 12, 1953

C. R. HANNA 2,638,288

CONTROL SYSTEM FOR CRAFT OPERABLE IN SPACE

Filed Nov. 14, 1947

WITNESSES:
Robert A. Baird
E. F. Oberheim

INVENTOR
Clinton R. Hanna.
BY
Paul E. Friedemann
ATTORNEY

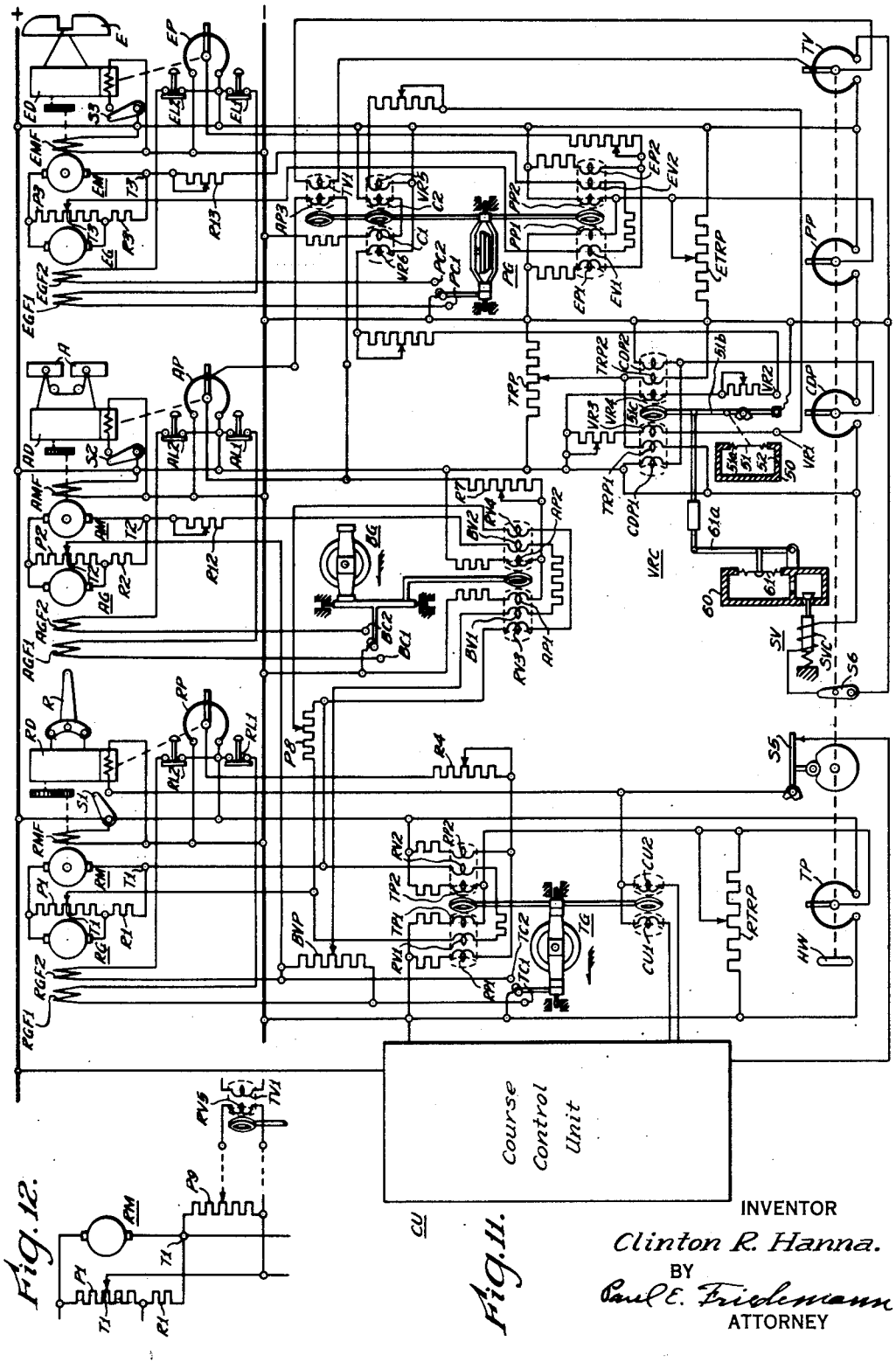

Patented May 12, 1953

2,638,288

UNITED STATES PATENT OFFICE 2,638,288

CONTROL SYSTEM FOR CRAFT OPERABLE IN SPACE

Clinton R. Hanna, Pittsburgh, Pa., assignor to Westinghouse Electric Corporation, East Pittsburgh, Pa., a corporation of Pennsylvania Application November 14, 1947, Serial No. 785,983

124 Claims. (Cl. 244—77)

This invention relates generally to systems of control and more particularly to control systems applicable in the control of conveyances operable in space.

The invention is herein illustrated and described as applied in the control of a conventional aircraft utilizing rudders, elevators, and ailerons, respectively, for controlling the craft directionally, longitudinally and laterally. However, it will be appreciated that the invention may be applied to other types of craft utilizing means other than the control surfaces mentioned for effecting maneuverability.

In order that the present invention may be fully appreciated, it is essential that the fundamental principles of flight control be understood.

The control of an aircraft may be resolved about three mutually perpendicular axes. One is a vertical axis termed the turn axis about which yawing or turning movement of the craft takes place, such movement being effected by the application of left or right rudder for a turn to the left or to the right. A second axis disposed longitudinally of the craft and perpendicular to the said vertical axis is termed the roll axis about which the aircraft rotates. Movement about the roll-axis is controlled by the ailerons which are simultaneously operated in opposite directions, that is, one moves up as the other moves down, to produce cumulative torques about the roll-axis. The third axis passes laterally of the craft perpendicular to the aforenamed axes at the point of intersection thereof and is termed the pitch axis of the craft. Control of the craft about the pitch axis for a dive, a climb or level flight is afforded by the elevators which tilt the craft longitudinally about the pitch axis to change the angle of attack of the wing airfoil and as a consequence the direction of flight of the craft in a vertical plane.

In still air when the aircraft is oriented so that its roll and pitch axes are horizontal, it will tend to follow a course which is the projection of the roll axis or longitudinal axis. But whenever the craft is rotated about one or more of the three control axes, either by the application of one or more of its control surfaces or by air disturbances, the flight path as a rule changes.

It is important to note, and this is particularly true of the ailerons, that the position of the control surfaces does not determine the position of the aircraft about any of the control axes, but rather determines the velocity of movement about the corresponding axis. Thus in maneuvering the craft it is necessary to perform double operations in the application of the control surfaces. In a simple turn, for instance, first the application of the control surfaces is made in a direction to cause the craft to assume the desired attitude in flight after which the ailerons are usually returned to a neutral or streamlined position and the rudder and elevators streamlined to a lesser extent. A return to level flight is then effected by a reverse movement of the ailerons and movement of the rudder and elevators to their neutral positions.

To properly execute a turn in an aircraft it is essential that movement of the control surfaces be co-ordinated. Too much rudder will cause the craft to skid outwardly in a turn, too much aileron will cause side slipping, while insufficient application or over application of the elevators during a turn will tend to cause respectively, diving and to a lesser degree climbing.

In addition to the above described proportioning of control surface movement which must be effected, there is also the consideration of suitable time delays in the application or removal of rudder and elevators in the execution of simple turns. The ability of an aircraft to be turned by simple application of the rudder depends in some measure upon the aerodynamics thereof. An inherently stable craft upon the application of rudder and the skidding movement which follows will tend to accumulate the bank angle necessary for equilibrium in the indicated turn. However, in any case a turn may not be executed satisfactorily in the absence of a bank angle. Thus for a coordinated turn it will be appreciated that the application of the rudder should be proportional to the angle of bank and should be applied no more rapidly than or should follow substantially the angle of bank as the bank angle for the desired turn is accumulated. A suitable coordination of movement of the ailerons and rudder in certain types of aircraft, therefore, effects an application of the ailerons to produce a velocity of rolling movement about the roll axis to the desired angle of bank and the application of the rudder to produce the necessary turn velocities indicated by the instantaneous angles of bank, or, stated otherwise, provides for an application of the rudder such that the turn velocity indicated by the position of the rudder corresponds to that for the instant angle of bank.

The considerations involved in the control of the elevators are analogous to those for the control of the rudder. Premature application of the elevators when entering a turn will cause the aircraft to climb, while, premature removal thereof coming out of a turn will cause the aircraft to dive. The application of up-elevator for a turn in either direction may be viewed as compensating for the reduction in horizontal lifting surface of the wing for a given angle of bank, by increasing the angle of attack of the airfoil to increase the lift. Thus the angle of bank also indicates the pitch velocity of the aircraft in a turn and coordination of control requires that up-elevator be applied and removed as the angle of bank is increased or decreased.

The time delay in acquiring a given bank angle depends upon the characteristics of the particular aircraft. In general, the larger the craft, the longer will be the time delay. Additionally this delay will vary depending upon the degree of application of the ailerons which determines the roll velocity for a given air speed.

An important function of an aircraft flight control system or automatic pilot is to fly the aircraft straight and level at a given altitude. To this end the control must be quick to sense minor departures from fixed reference positions and/or velocities about any of the three principal control axes to maintain a predetermined mode of operation.

Control systems accomplishing this end usually incude gyroscopes to detect errors in flight from the predetermined flight pattern. Such gyroscopes have been of the position type, that is, gyroscopes disposed on the aircraft to detect changes in flight attitude, and produce signals which when applied to suitable servo systems operating the control surfaces, restore the aircraft to the desired flight attitude. Gyroscopes of the position type, however, by reason of their mounting have only a limited degree of freedom about a given reference position and limit the maneuverability of the craft. If the maneuverability limit about a given axis is exceeded, the gimbal mounting of the gyroscope forces the rotor assembly around in rotation with the aircraft about the mentioned given axis and the resulting precessional response of the device results in "tumbling" of the gyroscope or gyroscopes rendering the automatic pilot useless.

One object of this invention is to provide a system of control for a body operable in space which is simple in principle, involves a minimum number of parts and is positive in operation.

An additional object of this invention is to provide a system of control for a body operable in space which is compact in design and light in weight.

Another object of this invention is to provide a system of flight control for an aircraft in which coordination of control surface movement is had to maintain equilibrium in flight.

Yet another object of this invention is to provide a system of the character referred to in the preceding object, involving gyroscopes in which the gyroscopes cannot tumble.

Still another object of this invention is to provide a system of the type mentioned in which velocity type gyroscopes are employed to detect motion about the three principal axes of control of the aircraft.

Further to the preceding object, it is a specific object of this invention to provide suitable gyroscope means which may be embodied in systems of control for bodies operable in space.

A further object of this invention is to provide a system of the character generally described in the preceding objects in which the gyroscopes are restrained from appreciable movement.

An ancillary object of this invention is to provide a system of control for a motor affording accurate motor regulation in response to control stimuli.

Another ancillary object of this invention is to provide a system of control for a motor used to operate a control means for maneuvering a conveyance operable in space in which damping is afforded in dependence of motor velocity and/or angular position.

As noted in the preceding statements of objects this invention contemplates the use of velocity type gyroscopes to detect motion about the three principal control axes. Experience has proven that such devices are highly sensitive and respond to sufficiently low rates of movement about the corresponding control axes that appreciable departures of the aircraft from fixed reference positions about any one of the three control axes can occur only over relatively long periods of flying time. However, adequate control in some instances requires that the system be capable of correcting position errors. Directivity in the case of the gyroscope associated with the turn axis may be obtained from suitable signals produced by the aircraft's compass. Such signals may be applied to the turn gyroscope to control the response thereof to rates of movement about the turn axis. Similarly the response of the pitch gyroscope may be controlled as a function of the rate of elevation change of the aircraft, or as a function of elevation displacements, or both. Means for sensing a rate of change of elevation may involve, for example, a device responsive to angular displacement about the pitch axis to control the response of the pitch gyroscope and impart vertical directivity thereto, the pitch angle being a substantial indication of the rate of change of elevation, or means for producing pressure differential quantities with elevation displacements to control the pitch gyroscope response. Elevation displacements may be detected with a substantially conventional altimeter and signals produced in dependence thereof to control the response of the pitch gyroscope. In the case of the roll or bank gyroscope it is preferred that the position reference correspond to the equilibrium position of the aircraft for any flight attitude. Suitable means are therefore provided to control the response of the roll gyro so that the reference position, therefor, rather than being vertical is in line with the vector representing the sum of gravity and the lateral acceleration.

Accordingly it is is also an object of this invention to provide a system of control for a body operable in space which is responsive to the velocity of movement of the body about each of the control axes thereof as well as the position of the body with respect to predetermined references.

Additionally it is an object of this invention to provide a system for controlling the rolling movement of an aircraft in which a gyroscope responsive to roll velocity is utilized to effect a control of the roll movement and which provides a position reference control for the roll gyroscope corresponding to the equilibrium position in roll for the aircraft for any flight attitude.

The foregoing considerations set forth the more important objects of this invention. Other objects and advantages will become apparent upon a study of the following disclosure when considered in conjunction with the accompanying drawings, in which:

Fig. 2 is a plan view of the gyroscope unit embodied in this invention;

Fig. 3 is a sectional view taken along the line III—III of Fig. 4;

Fig. 4 is an elevational view looking at the back side of the gyroscope unit;

Fig. 5 is an elevational view of the right side of the gyroscope unit;

Fig. 6 is a front elevational view of the gyroscope unit with portions broken away to show the pitch and turn gyroscopes;

Fig. 7 is an elevational view of the left side of the gyroscope unit shown partially in section;

Fig. 8 is a schematic diagram of an aircraft flight control system illustrating in detail one form of embodiment of this invention;

Fig. 9 is a variation of the circuit system of Fig. 8;

Fig. 11 is a variation of the invention of Fig. 10 incorporating a different method of control coordination; and Fig. 12 is a detail variation of Fig. 11.

Figure 1:
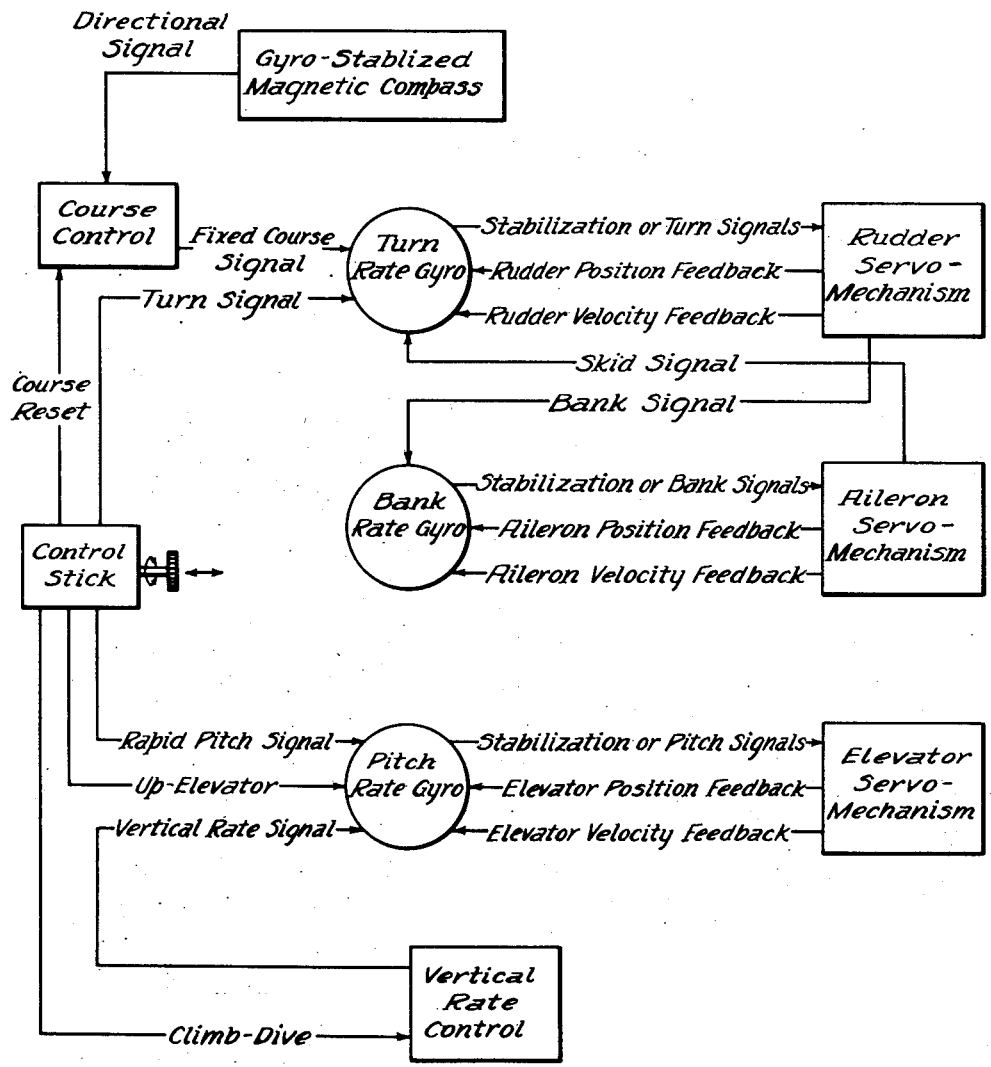
Fig. 1 is a block diagram embodying the fundamental principles of this invention.

The elementary features of the present invention are set forth in the block diagram of Fig. 1. The system is essentially a stabilizer of the aircraft. When connected with the gyro-stabilized magnetic compass it operates to maintain the heading of the craft fixed in response to the directional signal produced by the compass and when controlled by the turn and up-elevator signals produced by the control stick, its function is to position the aircraft in equilibrium in the particular flight attitude indicated by the control stick.

To this end the control system includes three rate gyroscopes, one a turn gyroscope disposed to respond to the velocity of movement about the turn axis of the aircraft, a second termed the bank gyroscope disposed to respond to the velocity of movement about the roll or bank axis and a third termed the pitch gyroscope disposed to respond to the velocity of movement about the pitch axis of the aircraft.

The output of each gyroscope is utilized to control a servo-mechanism which drives the corresponding control surface, the stabilization or turn signals of the turn gyroscope controlling the rudder servo-mechanism, the stabilization or bank signals of the bank gyroscope controlling the aileron servo-mechanism and the stabilization or pitch signals of the pitch gyroscope controlling the elevator servo-mechanism. As thus far described the system is essentially a velocity responsive stabilizer arranged to produce control surface movements tending always to check rates of movement about any one or all of the three axes of freedom of the aircraft and, since, a velocity of movement must occur prior to the actual displacement about any one of the axes of freedom, the control response is inherently fast and in a sense anticipatory of the impending change in attitude of the aircraft.

In order to impart directivity to the system each gyroscope is provided with a position reference. That for the turn gyroscope is represented in the fixed course signal produced by the course control unit in dependence of the directional signal of the compass. Orientation of the fixed course signal for a given heading of the aircraft is accomplished by the course reset control of the control stick. The fixed course control signal may be continuously applied or applied only at intervals as needed.

The position reference for the pitch gyroscope is represented in the vertical rate signal produced by the vertical rate control. This signal may be the result of a change in pitch attitude of the aircraft which is a function of the rate of ascent or descent and therefore indicates the rate of ascent or descent of the aircraft, or may be the direct result of the vertical rate of ascent or descent of the aircraft. The first mentioned type is employed in the systems of Figs. 8 and 9 while the second mentioned type is employed in Figs. 10, 11 and 12. With each type of vertical rate signal it may be found desirable to incorporate an adjustably fixed altitude or elevation reference if relatively minor excursions in altitude of flight cannot be tolerated. This may be connected either to intermittently or continuously influence the vertical rate signal and for the purpose of this discussion is assumed to be incorporated in the vertical rate control.

The position reference for the bank or roll gyroscope is physically embodied in the construction thereof in the form of a pendulous structure in which the axis of precession or the output axis of the gyroscope is removed from the center of gravity thereof so that its own mass responds strongly to gravity and to side accelerations during turns, making the reference position in line with the vector representing the sum of the gravitational and lateral acceleration components. Due to simplicity this arrangement is preferred; however, it will be apparent that the roll gyro could be made neutral, that is, balanced about its precession or output axis similar to the turn and pitch gyroscopes and suitable instrumentalities employed to control the response thereof to produce the response characteristic described.

With the control arrangements herein disclosed the aircraft is maneuvered into a turn simply by rotating the control stick. Since, as previously described, a coordination of control surface movement must be had to properly turn the aircraft, provision is herein made by interconnection of certain of the system components to obtain substantially simultaneous movement of the various control surfaces. One way of accomplishing this is to provide an interconnection of the turn and bank systems to coordinate rudder and aileron movements, and to apply turn and up-elevator signals respectively to the turn gyroscope and the vertical rate control. As illustrated a bank signal representing the rudder control is applied from the rudder control system to the bank gyroscope and a skid signal representative of the control of the ailerons is applied to the turn gyroscope, each of the two mentioned signals controlling the response of the corresponding gyroscope.

Upon turning movement of the control stick the turn and up-elevator signals are applied to the turn gyroscope and the pitch gyroscope, respectively, in any suitable sequence and, at the same time, due to the course reset signal of the control stick, the course control unit is effectively disconnected from the turn gyroscope. This unit, the details of which will hereinafter appear, now functions under the influence of the directional signal to follow the turning movement of the aircraft in azimuth and is, therefore, properly oriented with respect to the new course when reconnected with the turn gyroscope upon completion of the turn.

The effect of the turn signal upon the turn rate gyroscope initiates an output thereof in correspondence with the input signal. The bank rate gyroscope under the influence of the bank signal from the rudder system actuates the ailerons initiating a velocity about roll axis. And the up-elevator signal on the pitch rate gyroscope produces the necessary up-elevator motion to afford the needed velocity about the pitch axis in correspondence with the asked-for turn rate. The proper bank angle is achieved by the function of the bank gyroscope which senses errors in equilibrium in bank angle as previously described.

The individual control surface systems are additionally controlled by feed back signals from the control surface servo-mechanisms to the corresponding rate gyroscope. One signal is a suitable function of the velocity of operation of the particular servo-mechanism while the other signal is a function of the operating positions of the servo-mechanism or the control surface. Each signal controls the response of the corresponding rate or velocity type gyroscope. The velocity signal in each case is fed back in a negative sense providing velocity damping so that the control surfaces are prevented from moving too rapidly.

Having generally described the fundamentals of the invention in connection with Fig. 1, it will be well to consider the rate gyroscopes in detail that their function in the system may be more fully appreciated. Figs. 2 through 7 illustrate the gyroscope assembly. It will be observed that the assembly constitutes a compact unit housing the three gyroscopes. The unit is oriented in the aircraft with respect to the direction of flight in the manner illustrated by the arrows, the cross in the circle indicating a direction of flight into the plane of drawing and the dot within the circle indicating a direction of flight out of the plane of the drawing.

The gyroscopes are supported by a plurality of upstanding plates 10 secured upon a base 11. Each includes a cup-shaped rotor 12 enclosing a stator 13, carrying a winding (not shown) forming a hysteresis motor and this assembly is secured in each case within a gimbal type of support 14 having the spin or rotor axis of the gyroscope disposed transversely thereof. In the case of the turn and pitch gyroscopes TG and PG, respectively, the output torque axis or precession axis is formed in each case by bearings 15 in the extremities of the gimbal support 14 forming an axis longitudinally thereof disposed at right angles with the spin axis of the gyroscope. Studs 16 which thread through suitable bushings 17 in the plates 10 engage the bearings 15 and thereby support the turn and pitch gyroscopes for rotation about their output torque or precession axes. As hereinbefore noted each of the turn and pitch gyroscopes are neutral, that is, each is balanced about its precession axis so that static torques about the precession axis due to mass unbalance are not developed.

The gimbal support 14 of the bank gyroscope BG is secured at one extremity to a vertically disposed bar 18 journalled at its lower extremity in the base 11 and similarly journalled at its upper extremity in a bracket 19 secured to one of the adjacent plates 10. The axis of rotation of the bar 18 is thus removed from the center of gravity of the gyroscope and in the assembly shown constitutes the output torque axis or precession axis of the bank gyroscope. This assembly forms, in effect, a highly damped horizontal pendulum.

Considering now the orientation of the gyroscopes, viewing any one of Figs. 4, 6 or 7, it will be observed that the turn gyroscope is arranged so that its precession and spin axes substantially parallel the roll and pitch axes for the direction of flight indicated and that the turn axis of the aircraft is perpendicular to both of the precession and spin axes (assuming a neutral position of the turn gyroscope). As a consequence angular movement of the gyroscope assembly in directions corresponding to movement about the roll and pitch axes of the aircraft does not produce precessional torques of the turn gyroscope. However angular movement about the turn axis of the aircraft displaces the plane of the rotor and since a degree of freedom exists about the precession axis at right angles thereto an output torque proportional to the velocity of angular movement about the turn axis results.

The pitch gyroscope is arranged so that its spin and precession axes parallel the turn and roll axes of the aircraft, respectively, and define a plane perpendicular to the pitch axes. Thus the pitch gyroscope is insensitive to angular movement about the turn and roll axes but has a precessional torque proportional to the velocity of angular movement about the pitch axes.

The roll or bank gyroscope is disposed so that its spin axis parallels the pitch axis and its precession axis parallels the turn axis. Thus pitching movement does not effect displacements of the plane of the rotor and although the plane of the rotor is displaced by movement of the aircraft about the turn axis the gyroscope is secured against movement about an axis at right angles thereto and is therefore insensitive to turning movement. However, the axis of precession of the bank gyro BG, defined by the bearings of the vertically disposed bar 18 is perpendicular to the roll axis of the aircraft. Thus rolling movement of the aircraft displaces the plane of the rotor of the gyroscope and precessional movement thereof results.

An important advantage of the present system of control over previous types results from the use of gyroscopes which are constrained and therefore cannot tumble during maneuvers of the aircraft regardless of the flight attitude which may occur. Thus, in no case, is it necessary to disconnect the system for the purpose of making a turn. This follows from the fact that the velocity type of gyroscope is secured to the body to be controlled to detect a velocity of movement about a given axis. Since the precessional torque is proportional to the input velocity the magnitude thereof is usable in the production of control quantities for minimizing or eliminating the input velocity. Hence, precessional movement of the gyroscope may be limited to very small angles.

There are, of course, numerous arrangements for limiting the precessional movement of the gyroscopes. The method employed in the present case is to utilize the contact assembly responsive to precessional movement of the gyroscope as the precession limiting members. Details of such an assembly appear in Figs. 6 and 7, having particular reference to the pitch gyroscope PG. In this assembly a radially disposed arm 20 (Fig. 7) is secured to one extremity of the gimbal support 14 of the pitch gyroscope. This arm at its free extremity terminates in a support 20a of substantially U-shaped cross-sectional configuration. Insulatedly mounted between the side portions of this support is a flexible contact carrying strip 21 which projects radially from its point of mounting towards the axis of rotation. A pair of stationary contacts hereinafter referred to as the pitch contacts in the discussions concerning the circuits, are designated PC1 and PC2. These contacts are threadedly supported in forked supports 22 secured to an adjacent plate 10 and are locked in predetermined positions forming a small spacing with the movable contacts by a screw 23 which springs the forked extremity of the contact supports 22 together. The extremity of the flexible contact strip 21 projecting beyond the contacts carried thereby projects into an opening in a block 24 secured to the radial arm 20, sufficient clearance being provided to permit flexing of the contact strip during normal precessional movement but yet affording support of the contact extremity of the flexible strip to prevent excessive deflection upon the occurrence of high precessional torques. A similar assembly is utilized on the turn gyroscope TG; hence, corresponding parts thereof bear like reference characters.

Except for the manner of mounting the contacts of the bank gyroscope BG, the contact assembly is the same as that described for the pitch and turn gyroscopes. In the assembly for the bank contacts (see Figs. 5 and 6) a flexible contact strip 25 is insulatedly supported by a bracket 26 on the pivoted bar 18 forming the precession axis for the bank gyroscope. Contact strip 25 is bent to project through a hole 27 in the pivoted bar 18 and at its free extremity carries a set of contacts which cooperate with the stationary contacts BC1 and BC2, the stationary contacts being supported in forked blocks 22 the same as those for the stationary contacts of the pitch and turn gyroscopes. Excessive deflection of the flexible contact strip 25 and, hence, limiting of precessional movement is again obtained by the block 24 which receives the free end of the contact strip 25. In this instance block 24 is supported by a bracket 28 secured to the pivoted bar 18.

With the contact assemblies herein provided, contact pressures are determined by the precessional torque or output torque of the respective gyroscopes. However, the control of the contact assemblies throughout the range of operation is not simply that of engaging and disengaging the cooperating contacts but, is such as to afford hovering contact operation whereby average currents are obtained through the contacts to produce the desired control of the servo-mechanisms and associated control surfaces.

In the present case this function is achieved in part by the application of suitable biases about the precession axes of the gyroscopes by means of electromagnets to which the various control signals and feedback quantities referred to in the discussion concerning Fig. 1 are applied. The number of electromagnets employed on each gyroscope varies with the number of signals to be applied and the manner in which they are to be accommodated.

As illustrated each electromagnet includes an outer shell 29 of magnetizable material within which is supported a core 30. None of the coils are shown in the views illustrating the gyroscopes but each is illustrated in the accompanying circuit diagrams. These coils are conventional being annular in configuration and surrounding the core structure within the shell 29. Each of the electromagnet assemblies is secured to an adjacent one of the support plates 10 so that the cores of the oppositely disposed pairs are arranged in confronting relation. It will be noted that each of the confronting extremities of the cores projects beyond the magnetic shell therefor, the confronting extremities being separated by a small airgap.

The armature assemblies for the electromagnets of the turn and pitch gyroscopes each comprises a radial arm 31 secured to the extremity of the gimbal support opposite the contact arm attachment. This arm extends to opposite sides of the gimbal axis and at each extremity there is secured an annulus of magnetizable material 32 encircling the confronting extremities of the cores of the associated pairs of electromagnets and being of sufficient axial dimension to overlap the cores throughout the limited range of armature movement. This structure forms an overlapping gap construction in which the magnet force for all practical purposes is determined by the coil current independent of relative position of the armature with respect to the core.

Thus for a given coil current the magnetic force acting on the armature will be a given value irrespective of the position of the armature throughout its range of movement. Thus unlike a conventional magnet in which the armature force varies with its displacement with respect to the core, increasing as the armature moves towards the core, the forces acting on the armature are independent of the immediate position of the armature.

The armature assembly of the electromagnets for the bank gyroscope BG is carried by a bracket 29a secured to the pivoted bar 18 constituting the precession axis of the bank gyroscope. While not illustrated in detail this construction is the same as that for the bank and pitch gyroscopes.

A means for imparting directivity to the pitch gyroscope is embodied in a pendulum 2 pivoted at 33 to afford fore and aft angular freedom. The pendulum tends to maintain a vertical reference, which upon tilting of the gyroscope unit about the pitch axis of the aircraft to which it is secured, provides a measure of pitch attitude which in effect is a function of the vertical rate of motion of the aircraft.

Relative movement of the gyroscope unit and the pitch pendulum is converted into electrical signals for application to the electromagnets of the pitch gyroscope by means of the potentiometer regulator PR comprising a pair of opposed sets of flexible metallic conductors 4 carrying operatively associated contacts 4a which are slightly separated when the free extremities of the flexible conductors engage stops 4b. A prod 4c secured to the pendulum body is disposed between the opposed stacks of conductors and is of sufficient size that when in midposition several sets of contacts on each of the opposed flexible contact stacks are closed. Accordingly movement of the prod arcuately to the left or to the right as viewed in Fig. 3 closes additional contacts on one side as contacts on the other side are opened, affording push-pull operation of the contacts. As illustrated in the circuit diagrams of Figs. 8 and 9, the flexible conductors are connected along spaced taps of a pair of resistors PR3 and PR4 to provide controlled shunting of the two resistors, the variation in resistance being employed in suitable circuits to be described, for energizing the electromagnets of the pitch gyroscope. Centering means for the pendulum and potentiometer regulator assembly PR is had in the opposed spring assemblies 4d.

Biasing of the pitch pendulum is obtained by means of electromagnets 34 disposed in opposed relation having an armature 35 arranged therebetween. Although the pendulum has been shown separate from the pitch gyroscope and its control effect applied to the pitch gyroscope by means of electromagnetic effects, pendulosity may be embodied in the construction of the mentioned gyroscope. However, the illustrated method of control is preferred since response to longitudinal accelerations may be minimized.

Precessional damping for the bank gyroscope and damping of the motion of the pitch pendulum is provided by dashpots 36 and 37, respectively. Piston 38 of dashpot 36 is connected with the extremity of the gimbal support 14 remote from the point of connection thereof to the pivoted bar 18 by means of a flexible rod 39 connected between the piston and the mentioned gimbal support 14. Pitch pendulum 2 is similarly connected to the piston (not shown) of dashpot 37 by a rod 40.

The directively sense imparted to the pitch gyroscope by pendulum 2, as noted in the discussion of Fig. 1, may be dispensed with if minor excursions in altitude of the aircraft are not objectionable. Additionally, directivity may be obtained by other means, for example, the vertical rate control system VRC of Fig. 10 may be employed.

It will be apparent that upon orientation of the gyroscope unit of this invention in the aircraft in the manner indicated in the drawings, provision is had for detecting velocities about each of the three principal control axes of the aircraft and producing control quantities in the form of output or precessional torques of the gyroscopes converted to electrical quantities for effecting a control of the aircraft.

The function of the contacts with a balanced gyroscope rotating system in controlling the current flow in the control circuits under the influence of the precessional torques and the various electromagnetic biases applied to the gyroscopes, is known to be adequate. That is, a hovering contact condition to produce the correct average current for a given control condition follows from the correct proportioning of the respective gyroscope torques and electromagnetic biases afforded by the system. However, it may be found desirable to influence or augment contact vibration by introducing vibration into the gyroscope assemblies. A convenient way of doing this is to slightly dynamically unbalance the gyroscope rotor system to produce torque couples about the precession axis and thereby produce contact vibration corresponding to the running frequency of the gyroscope rotor. The degree of unbalance introduced will depend largely upon the operational requirements. In the present case, it is preferred to introduce rotor unbalance such as to obtain a fairly steep slope of the curve depicting the relation of output current to contact force, the slope of this curve then being decreased by the application of the control biases.

The embodiment of the invention illustrated in Fig. 8 differs in the matter of minor details from the diagrammatic showing of Fig. 1. However, the more fundamental aspects are the same. This system includes the three rate gyroscopes previously described and in this illustration the various coils of the electromagnets used in biasing the gyroscopes have been illustrated. Each gyroscope is arranged in a circuit system for controlling the corresponding control surface of the aircraft, the turn gyroscope being arranged in the system controlling the rudder R, the bank gyroscope being arranged in the system controlling the ailerons A and the pitch gyroscope being arranged in the system controlling the elevators E.

The system as a whole is supplied with power from a suitable source of direct current generally designated by the positive and negative signs. This voltage at the input side of the system is applied across a pair of resistors R4a and R4b having essentially equal ohmic values, to effect division of the source voltage. The two voltages E1 and E2 thus produced are equal and together with the source voltage provide the necessary supply of energy medium for the system illustrated, with the exception of the gyroscope motors.

The rudder R, ailerons A and elevators E are each operated by servo-mechanisms including motor generator sets, that for the rudder including generator RG and motor RM, that for the ailerons including generator AG and motor AM and that for the elevators including the generator EG and motor EM. Each of the motors is connected through a suitable reduction gearing unit to the corresponding control surface. Each of the motor fields, respectively designated RMF, AMF and EMF are connected directly across the power supply and are thus excited depending upon the source voltage. The field windings RGF, AGF and EGF, respectively, for the rudder, aileron and elevator generators are connected with contacts of the corresponding gyroscopes to provide reversal of excitation thereof. Field RGF is connected between the movable contact of the turn gyroscope TG and the midpoint of the voltage drop across the resistors R4a and R4b, the energizing circuit including the turn contact TC1 connected to the positive side of the source and the turn contact TC2 connected to the negative side of the source. Engagement of the movable contact of the turn gyroscope with contact TC1 forms a series circuit with the field RGF across resistor R4a applying voltage E1 in one sense while engagement of the movable contact with contact TC2 forms a similar series circuit across resistor R4b applying voltage E2 across the circuit of field RGF in an opposite sense. The circuit connections of the aileron generator field AGF with the bank gyro contacts including contacts BC1 and BC2 and the circuit connections for the elevator generator field EGF including the pitch gyroscope contacts PC1 and PC2 are the same as described for the rudder generator field, affording in each case a reversal of excitation of the aileron and elevator generator field windings.

The armature of the motor of each servo-mechanism forms one leg of an electrical bridge circuit, that for the rudder motor including a potentiometer P1 forming a pair of adjacent legs and the resistor R1 together with the armature winding of motor RM form the remaining two adjacent legs. The resistance values of the bridge components are selected to provide bridge balance depending upon the resistance of the motor armature winding when the motor is not rotating. Similarly the aileron motor armature winding forms one leg of a bridge circuit including potentiometer P2 and resistor R2 and the elevator motor armature winding forms a leg of a bridge circuit including potentiometer P3 and resistor R3. Generators RG, AG and EG excite the respective bridge circuits in circuit connections across potentiometers P1, P2 and P3, respectively.

This connection of the armature winding of each motor in a bridge circuit provides an indication of the velocity of operation of the motor, that is, the magnitude of bridge unbalance in each case is represented in the unbalance voltage appearing across the respective pairs of output terminals T1, T2 and T3 and the polarity of the unbalance voltage represents the direction of rotation. Bridge unbalance is caused by the back electromotive force generated in the armature winding when the motor is energized and rotating which produces an effective change in motor armature resistance corresponding to the rotational speed of the motor. Inasmuch as the motor fields RMF, AMF and EMF are connected across the supply voltage and the excitation thereof is maintained constant, the voltages produced by this method are representative of motor velocity and constitute in each case the velocity feedback signal used to bias the respective gyroscopes. Each voltage is applied in a negative sense so that too rapid movement of a control surface cannot take place. The feedback of a velocity stimulus in combination with the amplification characteristics of the control contacts of each gyroscope and the generator associated with each is the full equivalent of damping to the control surface movement.

Considering now the rudder section of the control system, the velocity signal is applied to the coils SV1 and SV2 arranged for push-pull operation which are connected in series and disposed on opposite cores of the turn gyroscope magnet. To these same two coils there is also added in series a voltage identified as the skid signal in Fig. 1 and which is produced across the skid voltage potentiometer SVP energized by the voltage appearing across the aileron generator field winding AGF. The magnitude and polarity of this signal represents the error existing in bank angle because of the action of the bank gyroscope tending always to produce a control of excitation of the aileron generator field to eliminate skidding or sideslipping of the aircraft. When the bank angle is correct, the bank gyroscope is in its neutral or midposition streamlining the ailerons and the skid voltage is zero. This circuit is traceable from terminal T1 on potentiometer P1, through coils SV1 and SV2 to the tap on skid voltage potentiometer SVP and terminates at the movable tap on resistor R1a connected across terminals T1 of the rudder motor bridge circuit. The arrangement of coils SV1 and SV2 on opposite cores produces opposed biasing effects on the armature 32 and these biases are preferably balanced.

Coils RP1 and RP2 arranged, respectively, on core with coils SV1 and SV2 form adjacent legs of a bridge circuit energized across the positive and negative conductors which includes the tapped portions of the rudder potentiometer RP as the remaining two adjacent legs, the movable tap of the rudder potentiometer being connected to a tap between the coils RP1 and RP2 by means of a resistor R4. Potentiometer RP is driven each way from center by the reduction gear unit connected with the rudder by means of an electromagnetically actuated clutch having a coil CC1 which is energized upon closure of the switch S1. The purpose of this magnet control of the turn gyroscope is to obtain an ultimate deflection of the rudder which is proportional to the sum of all the torques acting upon the turn gyroscope contacts. For example, if the gyroscope contacts are closed in one direction by a gyroscopic couple produced by an unwanted angular velocity of the aircraft about the turn axis, motor RM will rotate as a result of the voltage being supplied to it until the control surface potentiometer causes an unbalance of forces at the two coils just sufficient to equal the gyroscopic couple first mentioned. The rudder will then be in equilibrium at this position. This voltage control of coils RP1 and RP2 corresponds to the rudder position feedback of Fig. 1. Because the coils RP1 and RP2 are arranged on oppositely disposed cores, when the rudder is streamlined and the rudder potentiometer tap is centered, the biasing effects of these two coils are equal and opposed. The M. M. F's of the pairs of coils RP1, RP2 and SV1, SV2 are so related, however, that for a velocity voltage one direction the M. M. F. of coil SV1 opposes that of coil RP1 while the M. M. F. of coil SV2 aids that of coil RP2. When the velocity voltage reverses, indicating rudder motion in the reverse direction, the M. M. F's of coils SV1 and SV2 reverse and respectively aid that of coil RP1 while opposing that of coil RP2. The biasing effect of coils RP1 and RP2 thus produces linearity of magnet response to the energizing currents.

The fixed course signal which imparts directivity to the turn gyroscope and rudder servo system is selectively applied to a pair of coils CU1 and CU2 employed in biasing the turn gyroscope depending upon the direction of angular departure from a pre-set course. Means for producing the fixed course voltages may be of any suitable form. One such means includes a gyro stabilized magnetic compass (not illustrated) embodied in the block entitled Direction Indicator. This type of device includes a magnetic pickup commonly known as a flux valve. Briefly such a compass comprises three stationary magnetic members disposed at 120° in a horizontal plane so that the permeability of each is altered by the horizontal component of the earth's magnetic field. When the three members are excited by a single phase alternating current, there is produced in three secondary windings forming part of the magnetic members a set of voltages having double the applied frequency which are unbalanced in magnitude depending upon the direction of the earth's field. Such voltages are similar in every respect to single phase synchro transmitter voltages as the rotor of the synchro transmitter is turned. The voltage pattern of the flux valve is applied to the stator of a single phase synchro control transformer, the single phase output of which is amplified and employed to bias the directional gyroscope which in the instant application is of the position type. The bias forces acting about the input axis of the directional gyroscope produce precession movement thereof which by suitable mechanical connection with the rotor of a second synchro control transformer effects rotational movement thereof producing a strong output voltage pattern. This output voltage pattern is applied to the stator of a synchro unit S connected in a suitable network whereby a control of the tube 48 is had.

Vacuum tube 48 is provided with a pair of plates connected with the positive side of the source. The circuit for plate 48a including choke coil 48c and coil CU2 and the circuit for plate 48b, including, choke coil 48d and coil CU1. Choke coils 48c and 48d together with the shunt connected capacitor 48e form a filter network for the plate circuit tending to provide vibrationless electromagnet control for the turn gyroscope. Suppressor grid 48f is connected to the positive side of the supply source through one blade of switch S4. Control grids 48g and 48h are connected to opposite terminals of a bridge network including a potentiometer P4 and the secondary winding of a transformer TR1. The cathode 48k is connected to the negative side of the source, completing the power circuit for the tube.

A circuit including the secondary winding of a transformer TR2 and series resistor R5 is connected across the remaining two terminals of the bridge network formed by a tap on the secondary winding of transformer TR1 and the adjustable tap of potentiometer P4. A constant bias is applied to the control grids 48g and 48h by connection of the potentiometer tap to the positive side of the source, the adjustment being such as to balance the plate currents of the tubes when the error signal is zero. A reference voltage having a frequency equal to the frequency of the voltage pattern of the synchro unit S is applied to the primary winding of transformer TR2 providing simultaneous enabling of both sections of the tube 48 in synchronism with the output of synchro unit S.

The output side of the synchro unit S is connected across a resistance bridge network including a pair of resistors R6 in opposite legs. Resistors R6 are of higher resistance than the two remaining resistors, thereby normally unbalancing the bridge circuit and are of material in which the resistance decreases as the voltage thereacross increases, tending to reduce the bridge unbalance as the bridge input voltage increases. This expedient is employed to reduce the range of voltages which may be applied to the amplifier over the full range of course error signals so that a higher sensitivity to relatively minor course error signals may be had without exceeding the amplifier range over the higher range of course error signals.

The instantaneous phase relation of the error signal with respect to the reference voltages on the grid circuits of the tube 48 depends upon the direction of angular displacement of the aircraft with respect to the set course, and drives one grid more positive as the other is made positive in a degree depending upon the extent of angular phase shift of the error signal, with respect to the reference signal. This push-pull operation of tube 48 unbalances the currents of the plate circuits and causes coils CU1 and CU2 to produce a corrective bias on the turn gyroscope to correct the heading of the aircraft. The current magnitudes are preferably made small so that only a limited velocity of corrective movement can take place. This is deemed sufficient since actual errors in heading are very small and do not require rapid correction.

During fixed course operation the rotor of the synchro unit S is locked by suitable means (not shown) to prevent rotation. The tendency of the control is therefore to orient the aircraft in azimuth so that the flux pattern appearing in the stator of the synchro unit S is in quadrature with the rotor winding axis, at which time the voltage induced in the rotor winding is zero.

Means for repositioning the rotor of the synchro unit during manually initiated turns of the aircraft may be of several forms, for instance, a repeater motor may be employed to drive the rotor into correspondence with the new heading upon completion of the turn. While this is a practical expedient, it involves additional equipment adding weight and complications to the control. It is, therefore, preferred to employ the method illustrated in which the rotor winding is short circuited during a turn and unlocked so that it may act as a repeater motor and follow the rotating electrical field of the stator. Upon completion of the turn, the rotor winding axis is therefore, properly oriented with respect to the incoming signal and the rotor winding may be reconnected to the amplifier input circuits by removal of the closed circuit connection.

The means for accomplishing this operation may include a relay STR having a single set of contacts STR1 connected to short the rotor winding of the synchro unit S. The coil of relay STR is energized in a circuit across the source including switch S1, switch S5 and switch S4, the switch S5 being actuated by movement of the handwheel HW upon manipulation thereof to effect a turn of the aircraft. Suitable means (not shown) may be provide to actuate the mentioned locking mechanism for the rotor of the synchro unit at the same time switch S5 is operated. For further specific details of the course control system hereinbefore described, reference may be had to a copending application of I. M. Holliday et al., Serial No. 785,984, filed on the same date as this application, entitled Control System, and assigned to the same assignee as this invention.

The remaining pair of biasing coils TP1 and TP2 on the turn gyroscope in this embodiment of the invention are arranged on separate cores. This particular construction is not shown in the views illustrating the gyroscopes but such an addition to the structure is readily made. These coils are controlled by the turn potentiometer TP which is actuated by the handwheel HW and are disposed on opposite cores in parallel circuits between resistors R4a and R4b and the movable tap of potentiometer TP which, in turn, is connected across the power supply. Each coil circuit includes a rectifier which are respectively designated 42 and 43. These are oppositely disposed. When the turn potentiometer is centered, the voltage across the coil circuits is zero, each extremity thereof being at the midpoint of the supply voltage, but when the potentiometer TP is operated, a voltage appears and its polarity depends upon whether the movable tap of potentiometer TP is at a point which is more positive or less positive than the midpoint of the source voltage. In view of the rectifiers, one coil or the other is, therefore, energized depending upon the polarity of the applied voltage. This method of energizing coils TP1 and TP2 represents an alternative for the overlapping gap magnets described. If conventional electromagnets are employed, the use of the rectifier permits only one of the coils to be energized at a time, thereby preventing the need of an average current with its consequent negative stiffness effects.

Means for balancing the rudder control system when the turn potentiometer is centered is had in the rudder trim potentiometer RTRP connected across the power supply and having an adjustable tap connected with the movable tap of the turn potentiometer TP. Adjustment of this tap of the trim potentiometer trims the network including coils TP1 and TP2 to correct for off center conditions.

Energization of the electromagnet coil system of the bank gyroscope is analogous in many respects to the turn gyroscope system just described. Velocity feedback to the electromagnets is applied to coils BV1 and BV2, and this circuit is completed through a tap on the bank voltage potentiometer BVP, which potentiometer, analogous to the case of the skid voltage potentiometer, is connected across the field of the rudder generator RG. The velocity feedback and bank voltages are applied in series in this circuit and provide the necessary interconnection of the turn and bank controls to coordinate aileron motion with the rudder motion as well as introducing the required damping of control surface movement.

The aileron potentiometer AP is driven by the gear reduction unit connecting the aileron motor with the ailerons through an electromagnetically actuated clutch having a coil CC2 connected across the positive and negative conductors by switch S2. The aileron potentiometer AP forms a bridge circuit with the coils AP1 and AP2 which is energized across the power supply, the coils forming adjacent legs and the tapped portions of the potentiometer forming the remaining two adjacent legs. The circuit is completed by resistor R7 which connects the potentiometer tap with a point between the two coils. The coils are arranged in the circuit to produce opposed magnetic effects when the potentiometer tap is centered, one or the other predominating when the potentiometer tap is moved one direction or the other from center position.

Coils BP1 and BP2 are controlled by the bank potentiometer BP and like the coils TP1 and TP2 are disposed upon a core separate from the remaining coils. One pair of terminals of the two coils are connected between the resistors R4a and R4b representing the midpoint of the voltage drop across the power supply and the remaining extremities are connected to the tap of bank potentiometer BP. The coil circuit connections illustrated again include a set of oppositely disposed rectifiers here designated 44 and 45 in the individual branches, the purpose being to minimize negative stiffness as in the case of the coils TP1 and TP2 controlled by the turn potentiometer. Movement of the tap of the bank potentiometer to either side of center position correspondingly energizes one or the other of coils BP1 and BP2 biasing the bank gyroscope about its precession axis. An electrical position bias is not needed for the bank gyroscope because of its pendulosity producing a reference position corresponding to the proper bank angle for a given attitude of flight.

The pitch gyroscope is also controlled in dependence of a velocity feedback signal. This signal is taken from the bridge circuit including the elevator motor EM and is applied to the pitch velocity coils PV1 and PV2, the circuit including a tapped portion of potentiometer P5 which is connected across the output terminals of full-wave rectifier 41. Whenever an airplane banks, its loss of lift, as previously described, must be compensated by an upward movement of the elevators to introduce a pitch velocity producing an increase in angle of attack of the wing sufficient to compensate the loss of lift. In Fig. 3 this is accomplished for either direction of banking by rectifying the voltage across the field of the aileron generator and applying a controllable portion of the resulting unidirectional voltage to the pitch velocity coils PV1 and PV2, the voltage application being in series with the velocity feedback voltage. To this end one input terminal of the full-wave rectifier 41 is connected to a point between the resistors R4a and R4b representing the midpoint of the voltage drop across the power supply, while the remaining input terminal is connected to the movable contact of the bank gyroscope BG which is selectively connected with either the positive or the negative side of the supply source in a degree depending upon the control afforded by the bank gyroscope. Alternatively up-elevator may be produced by applying the voltage appearing across the rudder generator field RGF to rectifier 41.

A feedback voltage in dependence of the elevator position is obtained in a manner similar to that for the turn and bank gyroscopes by connection of the elevator potentiometer EP in a bridge circuit with the coils EP1 and EP2, the movable tap of the elevator potentiometer EP being driven by the reduction gearing connecting motor EM with elevators E. An electromagnetically operated clutch having a coil CC3 energized across the power supply by a switch S3 furnishes the mechanical connection of the movable tap of the elevator potentiometer EP with the reduction gearing of the elevator drive.

The vertical rate signal identified in Fig. 1 is applied to coils PR1 and PR2 from the output of the potentiometer regulator PR under the influence of pendulum 2, both components forming part of the vertical rate control VRC. As illustrated, the coils PR1 and PR2 are connected in series with the resistors PR3 and PR4, respectively, in parallel circuit branches across the power supply and the magnetic effects of the coils on the armature of the electromagnet assembly are opposed, being in equilibrium when the pitch pendulum and potentiometer regulator are in a selected midposition. Thus the push-pull shunting effect upon the resistance elements PR3 and PR4 oppositely varies the excitation of the coils PR1 and PR2 to afford a control of the pitch gyroscope about the precession axis in dependence of pitch attitude and, hence, the vertical rate of the aircraft.

Energization of coils PP1 and PP2, which, like coils TP1 and TP2 in the rudder control, are disposed in opposition on cores separated from the other coils biasing the pitch gyro, is controlled by the pitch potentiometer PP which is manually operated by the handwheel HW. Both handwheels illustrated have been given the same reference identification since in the physical embodiment a single handwheel is employed to drive the three potentiometers TP, BP and PP, rotational movement of the handwheel moving the taps of the potentiometers TP and BP and push-pull movement of the handwheel driving the movable tap of potentiometer PP. This method of illustration has been elected to avoid complication of the drawings with non-essential mechanical details. If desired, the three potentiometers may be controlled independently by three control knobs or may be connected together to a control stick having three degrees of freedom instead of the two described to afford any desired proportioning of the control of the three potentiometers.

Potentiometer PP is connected across the power supply and its movable tap is connected between the rectifiers 46 and 47 which are respectively connected in series with the coils PP1 and PP2 forming a parallel circuit terminating between resistors R4a and R4b, this connection being the same as that for the turn and bank potentiometer and their respective coils. The voltage applied to the coils PP1 and PP2 corresponds to the rapid piston signal identified in Fig. 1.

Summing up the biases which control the respective gyroscopes, the turn rate gyroscope electro-magnet system has applied thereto a velocity voltage taken from the terminals T1 of the rudder motor bridge circuit, a position voltage from the rudder potentiometer RP, a skid voltage taken from the skid voltage potentiometer SVP, a fixed course voltage taken from the course control unit CU and a turn voltage taken from the handwheel operated turn potentiometer TP.

The bank rate gyroscope electromagnet system has applied thereto, a velocity voltage taken from the terminals T2 of the aileron motor bridge circuit, a position voltage taken from the aileron potentiometer AP, a bank voltage taken from the bank voltage potentiometer BVP, and a bank voltage from the handwheel operated bank potentiometer BP.

The pitch rate gyroscope electromagnet system has applied thereto, a velocity voltage taken from the terminals T3 of the elevator motor bridge circuit, a position voltage taken from the elevator potentiometer EP, a vertical rate voltage taken from the vertical rate control VRC, a unidirectional up-elevator voltage corresponding to the voltage across the aileron generator field AGF or, alternatively, the rudder generator field RGF, and a rapid pitch voltage taken from the handwheel operated pitch potentiometer PP.

It should be noted that the order in which these various voltages appear, their magnitude and their control effect depends largely upon the specific operating condition.

The control system of Fig. 8 differs as a whole from that of Fig. 1 in that the up-elevator signal of Fig. 1, in Fig. 8, is applied directly to the pitch gyroscope by the circuit network energizing the coils PV1 and PV2 including the full wave rectifier 41. In Fig. 1 this would correspond to a connection between the aileron servo-mechanism and the pitch gyroscope. Additionally the climb and dive signal of Fig. 1 from the control stick to the vertical rate control is not included in Fig. 8. Fig. 8 also provides a connection of the control stick with the bank gyroscope through the medium of the bank potentiometer BP. This would correspond to a connection between the control stick and the bank gyroscope in Fig. 1.

In the interest of simplicity details of the power supply of this system have not been shown. However, 400 cycle power is presently used on many aircraft and it will be appreciated that a suitable A.-C. motor D.-C. generator set may be employed to produce the source voltage. Similarly, energizing circuits for the gyroscope hysteresis motors are not illustrated but the gyroscopes are readily designed to operate on the 3-phase 400 cycle power supply of the aircraft.

As a rule control of the aircraft during take-off is done under the manual control of the pilot. Once the plane is flying at the proper altitude on the selected course, the control is switched over to the automatic pilot. In accomplishing this the gyroscopes are started and brought up to operating speed, after which the source voltage may be applied and switches S1, S2 and S3 closed to connect up the drives for the potentiometers RP, AP and EP, respectively. The relay STR remains deenergized until switch S4 is closed. Thus at this instant the rotor winding circuit of the synchro unit S is closed through the contacts STR1 and the position of the rotor is synchronized with the voltage pattern of the directional indicator, which properly orients the rotor for zero voltage output for the selected course. Closure of the switch S4 energizes relay STR opening the rotor short circuit at which time the rotor signal voltage is effectively applied to the input side of the amplifier of the course control unit CU. At this time the rotor of the synchro unit S is locked to prevent movement thereof.

The system now functions to maintain the aircraft on the selected course and to this end a velocity of motion about any one of the three control axes is instantly detected by the corresponding gyroscope. In the rudder section of the system, yawing velocity produces output torque at the turn gyroscope in a direction which produces servo-mechanism operation to apply the rudder so as to produce an opposite yaw velocity. During this interval the velocity feedback voltage and the rudder potentiometer feedback voltage produce electromagnetic biasing torques about the output axis of the turn gyroscope which oppose the precessional or output torque thereof. The hovering contact condition which results produces an average current in the field of the rudder generator causing rudder movement at a predetermined rate which is a function of the velocity disturbance about the yaw axis. As rudder movement increases the electromagnetic bias increases, the velocity disturbance decreases and the gyro output torque decreases, reducing the output current. At equilibrium the electromagnetic bias opposes and balances the gyro torque output at which point the motor stops and just sufficient current is circulated to supply the required torque to the rudder. At this point the velocity feedback voltage is zero since the bridge circuit of the motor generator system is balanced. The rudder correction is now maintained for that small interval of time necessary to check the velocity disturbance, at which time the gyroscopic response drops to zero with the velocity disturbance and the overbalancing electromagnetic bias produces a reversal of the servo-mechanism causing reverse rudder movement to neutral position. The function of the system in the reverse direction is essentially the same.

Cumulative errors in course or heading are detected by the direction indicator and the error signal voltage applied to the input of the amplifier unbalances the currents circulating in coils CU1 and CU2. The unbalance torque about the output or precession axis of the turn gyroscope influence operation of the sermo-mechanism for the rudder in a direction to correct the course error. While the course correction illustrated is continuous, it may of course be applied only at intervals to correct the slight cumulative course error.

Operation of the turn gyroscope produces voltages across the bank voltage potentiometer BVP which are applied to coils BV1 and BV2 of the bank gyroscope electromagnet system. Thus upon application of the rudder to check a velocity of movement about the turn axis, the bank gyroscope is controlled to produce aileron servo-mechanism operation in a direction to apply the ailerons in correspondence with the direction of movement of the rudder. This introduces a velocity about the roll axis which is detected by the roll gyroscope which produces a gyroscopic output torque opposing the bank voltage bias and the velocity feedback voltage of the aileron servo system which now supplements the bank voltage signal. As the ailerons are displaced, another electromagnetic bias appears which aids the bank voltage and velocity feedback bias. This bias is the result of operation of the aileron potentiometer AP which controls the excitation of coils AP1 and AP2. Equilibrium of the ailerons results when the potentiometer AP is suitably displaced to balance the magnetic torques against the gyroscopic and pendulous torques of the bank gyroscope. When equilibrium in the bank angle is reached, the pendulous response of the bank gyroscope produces torques about the output axis thereof tending to center the bank gyroscope and return the ailerons to streamline position. The spring effect of the contacts also urges this gyroscope to center position.

Operation of the bank gyroscope produces a voltage across the skid voltage potentiometer SVP which is applied in series with the velocity feedback voltage of the rudder servo system to the coils SV1 and SV2 of the turn gyroscope electromagnet system. This voltage tends to hold back or suppress rudder application in the first instant since it is in series with the rudder velocity feedback voltage and, since the skid voltage diminishes with accumulated bank angle proper rudder application is provided.

Operation of the bank gyroscope in this system also controls the application of up-elevator for the indicated turn, the voltage appearing across the aileron generator field AGF being rectified by the rectifier 41 producing a unidirectional output irrespective of the direction of excitation of field AGF. The output of rectifier 41 is applied across potentiometer P5, a tapped portion of which is applied with the velocity feedback voltage of the elevator servo system to the pitch velocity coils PV1 and PV2 which produce cumulative torques about the output or precession axis of the pitch gyroscope PG. The contact operation of the pitch gyroscope is now in a direction to produce up-elevator affording the desired pitch velocity for the indicated turn. Upon the occurrence of pitch velocity the pitch gyroscope precessional torque opposes the electromagnetic biasing torque and elevator equilibrium occurs when the torques are balanced by the addition of the electromagnetic torque of the coils EP1 and EP2 controlled by the elevator potentiometer EP. The biasing effect of the coils PR1 and PR2 under the control influence of the pitch pendulum depends for its direction upon the pitch attitude of the aircraft and will be zero in a turn if the pitch velocity is correct, at which time the pendulum is centered.

Turns may be executed by the simple expedient of rotating handwheel HW displacing the movable taps of both potentiometers TP and BP and producing a coordinated unbalance of the electromagnetic biases of the pairs of coils TP1, TP2 and BP1, BP2. The magnetic torques then produced cause operation of the bank and turn gyroscopes in a suitable direction to effect, for example, right rudder and roll about the roll axis corresponding to the right rudder application. The gyroscope torques oppose the electromagnetic biases as previously described, producing the hovering contact condition and average excitation currents for the aileron and rudder generator fields. Switch S5 is opened by the cam driven by the handwheel and deenergizes relay STR. Simultaneously therewith the rotor of the synchro unit S is unlocked by means (not shown). Thus the rotor circuit is closed and the synchro unit functions as a repeater of the changing course of the aircraft in the turn. Up elevator for the indicated turn follows as a result of the application of the aileron generator field voltage across full wave rectifier 41.

Climbs and dives are executed by actuation of pitch potentiometer PP upon push-pull motion of handwheel HW connected thereto. Coils PP1 and PP2 under the control of pitch potentiometer PP produce the electromagnetic biasing torques for this operation. The response of the pitch gyroscope and elevator servo-system is similar to that for other of the described operations.

Cumulative errors in pitch attitude are detected by the pitch pendulum controlling the potentiometer regulator PR producing biases on the pitch gyroscope through the medium of coils PR1 and PR2, thus affording a vertical reference for the pitch control system.

The control system of Fig. 9 incorporates certain refinements over the system of Fig. 8. This system corresponds particularly with that of Fig. 1 and the detail differences over Fig. 8 are hereinafter noted. All parts hereof corresponding to those of Fig. 8 bear like reference characters.

The three servo systems of Fig. 9 are the same as those of Fig. 8 with the exception of the field systems of the generators. In this embodiment a pair of differentially related field windings is employed on each generator. These pairs are respectively designated RGF1, RGF2; AGF1, AGF2 and EGF1, EGF2 for the rudder, aileron and elevator generators. The fields of each pair are selectively connected across the positive and negative conductors indicated through the operation of the associated gyroscope contacts, for example, the energization of rudder generator field RGF1 is controlled by turn gyroscope contact TC1 while the energization of field RGF2 is controlled by contact TC2. Since the ampere turns of these fields are opposed, reversal of generator output and reversal of motor operation obtains from this arrangement. In accomplishing this, one side of field RGF1 is connected to the positive side of the source voltage through limit switch RL1 while the other side is connected to the negative or common side of the source through contact TC1 when engaged by the movable contact actuated by gyroscope TG. Field RGF2 is similarly connected across the source voltage by limit switch RL2 and contact TC2 when engaged by the movable contact of the set. The aileron and elevator generator field windings are similarly connected. As a safety measure, the limit switches are introduced in each field circuit and are actuated by the associated one of control surface potentiometer RP, AP and EP which indicates control surface position. Limit switches RL1 and RL2 as noted above are in series in the circuits for fields RGF1 and RGF2, respectively. Limit switches AL1 and AL2 are in series in the circuits for fields AGF1 and AGF2, respectively, and limit switches EL1 and EL2 are connected in series in the circuits for fields EGF1 and EGF2, respectively.

The gyroscopes of this system like those of Fig. 8 also function in response to rates of movement about the three control axes of the aircraft, the turn and bank gyroscopes again being interlocked and controlled by the skid and bank voltages of the potentiometers SVP and BVP as in Fig. 8, these potentiometer voltages being applied in series with the corresponding velocity feed back voltages to coils SV1, SV2 and BV1, BV2, respectively. The connection of potentiometers RP, AP and EP is unchanged while directivity is imparted in each case to the gyroscopes as before.

One pair of coils, namely BP1 and BP2, has been eliminated from the bank gyroscope together with the handwheel operated bank potentiometer BP. Bank angle for an indicated turn is now achieved for a set in turn rate at the handwheel by means of the bias control of the bank gyroscope afforded by the bank voltage potentiometer BVP and the inherent response of the bank gyroscope to side accelerations exclusive of the biasing effect of the bank potentiometer BP of Fig. 8.

The system of Fig. 9 contemplates the use of overlapping gap magnets for biasing the gyroscopes according to Figs. 2 through 7, inclusive. This consideration does not affect the connections for the coils receiving the velocity feed back voltages, the control surface position voltages, the bank and skid voltages or the aircraft position reference voltages. However, the turn and pitch potentiometers have been reconnected to form a bridge circuit with their respective electromagnet coils due to the elimination of rectifiers 42, 43, 46 and 47 employed in Fig. 8.

In the rudder section of the control system of Fig. 9, the tapped portions of potentiometer TP form adjacent legs of a bridge and the coils TP1 and TP2 form the remaining adjacent legs, the bridge being energized across the positive and negative conductors indicated and being balanced when the movable tap of the turn potentiometer TP is set in the mid-position or some arbitrary neutral position. The rudder trim potentiometer RTRP having the movable tap thereof connected between the coils TP1 and TP2 is again utilized to correct for off-center conditions. Any suitable control of excitation of the coils may be had by simple adjustment of the trim potentiometer tap. The pitch potentiometer PP is similarly connected in a bridge circuit with coils PP1 and PP2 and an elevator trim potentiometer ETRP is here included to afford trim of pitch attitude to accommodate minor variations of aircraft load distribution with different loads, minimizing the need for continuous correction of pitch attitude by the control system due to this condition or to other off-center conditions.

In the present system, up-elevator is obtained during manually initiated turns by an up-elevator potentiometer UEP under the control of the handwheel and operated upon rotational movement of the handwheel to initiate a turn. This potentiometer produces a unidirectional change in current in the coil UEP1 biasing the pitch gyroscope PG in one direction for either direction of handwheel motion. The signal thus produced corresponds to the up-elevator signal identified in Fig. 1. In accomplishing this, the potentiometer has its end points connected together forming a single terminal. Its movable tap is connected in series with coil UEP1 and a suitable resistance R8. It is located on a core separate from the other coils so as to be free of their magnetic biasing effects. Thus the force on the armature obeys the square-law and corresponding elevator control is obtained. The purpose for this will appear hereinafter. This circuit is energized across the positive and negative conductors. Potentiometer UEP forms the control element of the circuit in which the resistance upon movement of the potentiometer tap from mid-position in either direction is always reduced in ohmic value. As a consequence, the current change is always in one direction and the electromagnetic biasing effect on the pitch gyroscope is therefore in a direction to produce up-elevator.

The rapid pitch signal and the climb and dive signal are produced, respectively, by the potentiometers CDP and PP upon a single movement of the handwheel. Here also in the physical embodiment, control of the movable taps of the climb and dive and pitch potentiometers CDP and PP is produced by pushing or pulling motion of the handwheel HW. The pitch potentiometer unbalances the opposed magnetic effects of coils PP1 and PP2 to cause a torque about the output or precession axis of the pitch gyroscope thereby initiating elevator operation in a direction depending upon the direction of displacement of the movable tap. The climb and dive potentiometer is connected in a bridge circuit with the biasing coils CDP1 and CDP2 for the pitch pendulum so that movement of the movable tap thereof to left or right as viewed correspondingly unbalances the opposed effects of the two coils. The coils are trimmed for off-center conditions or for variation in pitch tending to displace the pendulum by means of a trim potentiometer TRP, the movable tap of which is connected with the movable tap of the climb and dive potentiometer between the coils CDP1 and CDP2. The unbalance effect upon the potentiometer regulator upon movement of the movable tap of potentiometer CDP produces a control of the potentiometer regulator PR in turn unbalancing the magnetic effects of the opposed coils PR1 and PR2 to produce a torque about the precession axis of the pitch gyroscope in the same direction as that produced by the pitch potentiometer.

During stabilizing operation, that is, during periods when the craft is being maintained on a fixed course by the automatic pilot, the bank and turn rate gyroscopes function as described in connection with Fig. 8 to check velocities of movement of the aircraft about the bank and turn axes thereof. In this case, however, the two mentioned gyroscopes select the particular one of the pair of differential fields associated with each of the aileron and rudder generators which is to be energized and the hovering contact condition controls the average current supplied to the fields.

The pitch gyroscope, however, is no longer controlled by the voltage of the aileron generator field as was the case in Fig. 8. Thus during stabilization the elevators are not applied until a velocity disturbance about the pitch axis occurs. The action of the velocity feed back and elevator position feed back biases are again opposed to the gyro output torque and hovering contact operation results, the elevators reaching equilibrium when the increasing electromagnetic biases due to the operation of the elevator potentiometer produce the necessary degree of hovering contact operation and the consequent current density in the elevator generator field circuit to cause the motor EM to hold the elevators in the mentioned position of equilibrium.

Coordinated turns by the pilot are initiated by turning the handwheel HW and operating the movable taps along the potentiometers TP and UEP which respectively set in the unbalance signals indicative of the asked for turn rate and pitch rate. Coils TP1 and TP2 produce the electromagnetic torque about the output axis of the turn gyroscope which energizes the proper field of the rudder generator. The bank voltage potentiometer introduces an electromagnetic bias about the output axis of the bank gyroscope causing excitation of the proper field of the aileron generator and the resulting skid voltage of the potentiometer SVP tends to suppress the rudder rate pending the accumulation of bank angle.

The control of the up-elevator potentiometer UEP initiates the application of up-elevator. If too little up-elevator is applied, the pitch velocity will not be sufficient and the aircraft will tend to nose down. Under this condition, the pitch gyroscope will respond to increase the output current to increase the rapidity of application of up elevator. Should the pitch rate be too high, the pitch gyroscope response will be reversed and work in a sense in opposition to the asked for pitch rate indicated by the setting of the up-elevator potentiometer.

Figure 10:
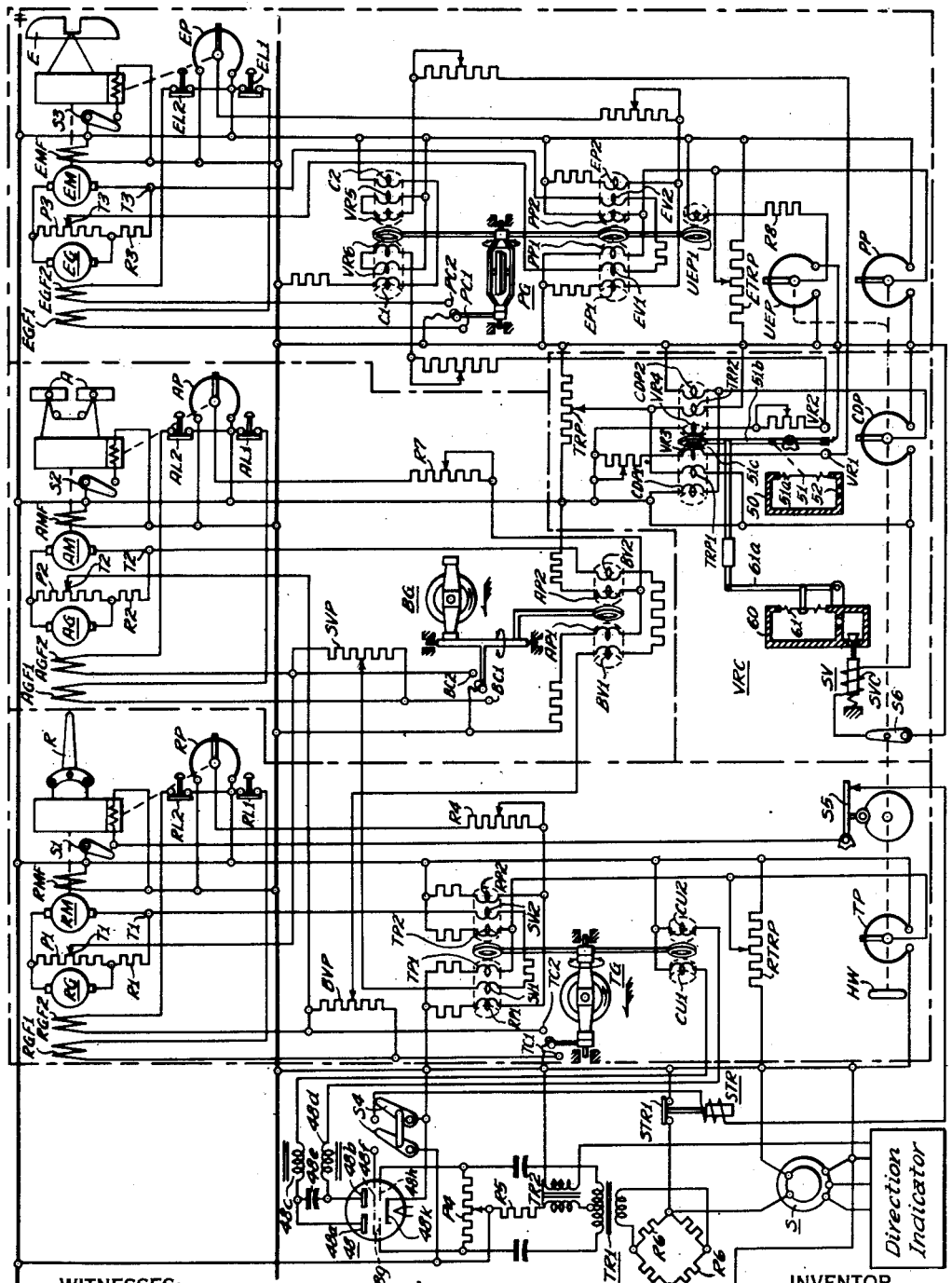
Fig. 10 is a schematic diagram directed to an improved form of this invention.

A preferred embodiment of the invention appears in Fig. 10 and differs primarily from Fig. 9 in the use of a different type of vertical rate control. Here also parts corresponding to those of Figs. 8 and 9 bear like reference characters.

In flight testing of the system herein described, the aircraft under certain conditions displayed a tendency to porpoise about the pitch axis. This was caused by the pitch pendulum responding to longitudinal accelerations resulting from changes in pitch attitude and which are opposed to the gravitational component also sensed by the pendulum. The resulting delay in pendulum response is of a duration depending upon the time required for the velocity to become constant. Since the primary purpose of the pitch pendulum is to prevent vertical excursions of the aircraft resulting from pitch velocities below the threshold of response of the pitch gyroscope or due to accumulated errors in pitch velocity correction, it was concluded that a means operable in dependence of variations in air pressure could be utilized to produce suitable indications of vertical rate.

Such a vertical rate device includes a chamber 50 having an opening therein sealed by a diaphragm 51 supported by an annulus 51a of flexible material. The chamber communicates with the atmosphere through a small orifice 52. With this construction, movement of the device vertically, as in an aircraft when ascending or descending, produces an air pressure drop across the orifice 52 depending upon the rate of change of the vertical component of motion and the diaphragm 51 is deflected proportionally. Movement of diaphragm 51 drives an arm 51b carrying the movable contact of the vertical rate contact assembly, including stationary contacts VR1 and VR2, involving a hovering contact principle similar to the gyroscope contacts previously described. The forces on the movable contact produced by the diaphragm are balanced by suitable electromagnetic biases. The vertical rate contacts VR1 and VR2 control the energization of a pair of opposed coils VR5 and VR6, respectively, forming part of the electromagnet biasing system for the pitch gyroscope. Thus under operating conditions, any change in pitch attitude or other condition producing vertical rates above the threshold of response of the vertical rate device, introduces a biasing control of the pitch gyroscope tending to produce a control of the elevators to effect the needed change in pitch attitude to check the vertical rate of the aircraft.

The desired hovering contact condition is achieved by suitable electromagnetic biasing of the arm 51b carrying the movable vertical rate contact. To this end, an armature 51c of magnetizable material is fitted to an extremity of arm 51b and a pair of electromagnets each having a plurality of coils are disposed on opposite sides of the armature to complete the electromagnet assembly. The first pair of coils VR3 and VR4 adjacent the armature are excited by the vertical rate contacts VR1 and VR2. These coils are opposed and one or the other is connected across the positive and negative conductors depending upon which direction the arm 51b is moved. For instance, when the movable contact engages contact VR1, coil VR3 is energized. The resulting magnetic force opposes the diaphragm force and opens the contact set which again closes due to the diaphragm force as the magnetic force diminishes. The contact frequency and contact pressure varies with the stiffness of the system which varies with the force of the diaphragm and hovering contact operation obtains. As a consequence, the average current flow in the system is a function of the vertical rate. The next set of coils TRP1 and TRP2 are controlled by the trim potentiometer TRP. These coils are also opposed and afford means for introducing predetermined degrees of unbalance for trimming the vertical rate system for off-center conditions.

Coils CDP1 and CDP2 are controlled by the climb and dive potentiometer CDP. This potentiometer is actuated by push-pull movement of the hand wheel. The magnetic effects of coils CDP1 and CDP2 are opposed. Thus movement of the potentiometer CDP from center unbalances the magnetic pull on armature 51c introducing a function of the setting of the climb and dive potentiometer into the contact operation.

Because the control afforded by the vertical rate device has no fixed altitude or pressure reference, a second device of a similar character may be provided. This second device, however, is sealed at a predetermined altitude. Thus it is affected by elevation displacements and is neutral only at the altitude at which it was sealed. This device includes a chamber 60 having an opening therein sealed by a diaphragm 61 which drives a pivoted arm 61a. Pivoted arm 61a is mechanically connected to the arm 51b actuated by the diaphragm 51. The biasing effect of arm 61a upon arm 51b is always in a direction to effect the necessary control of the vertical rate contacts to return the plane to the desired altitude of operation. This control like that of the course control unit may be small in effect so that noticeable control in elevation may not result. Additionally, means may be provided so that the control may be applied only at intervals, since vertical excursions are small under the velocity control of the pitch gyroscope.

The vertical displacement device is automatically sealed at any selected altitude upon push-pull motion of hand wheel HW in controlling the ascending or descending motion of the aircraft, by the solenoid operated valve assembly SV. This is accomplished by a switch S6 which is actuated by slight motion in push or pull directions of the hand wheel, switch S6 being normally closed when the hand wheel is in neutral position, energizing the coil SV1 of the solenoid valve. A spring 59 biases the valve assembly to open position. De-energization of the coil SV1 permits spring 59 to open the valve at which time chamber 60 communicates with the atmosphere. Thus during climbing or diving the instantaneous pressure within chamber 60 corresponds to the air pressure at the altitude of the aircraft. Upon leveling off of the aircraft and a return of the hand wheel to neutral, the switch S6 is closed as illustrated and the chamber 60 is sealed due to energization of the solenoid.

Turns of the aircraft are again initiated by rotation of the hand wheel HW which drives the turn and up-elevator potentiometers TP and UEP, respectively. The circuit connections in this application of the turn and up-elevator potentiometers to the turn and pitch gyroscopes are the same as in Fig. 9.

The up-elevator signal on the pitch gyroscope causes up-elevator application to provide the proper pitch velocity for the turn indicated by hand wheel rotation. This control is supplemented by the control of the vertical rate system which senses rates of change in altitude as well as displacements. Thus if the asked for pitch velocity set in by the up-elevator potentiometer results in a climb or a dive in the turn at a rate exceeding the threshold rate of the vertical rate device 50, or if below the threshold of response results in sufficient displacement in elevation, the biasing effect of the vertical rate system on the pitch gyroscope tends to modify the pitch signal to coordinate the pitch velocity with the bank angle and turn rate.

This system is operable without the up-elevator control provided in which case the elevator control section of the system operates as a follow-up control. Under this condition, during turns, vertical rates and displacements are detected by the vertical rate control and its biasing effect upon the pitch gyroscope produces the required elevator operation. Minor vertical excursions will result from this method of control since the range of sensitivity of the vertical rate system is not infinite and the threshold of response to vertical rates must be made with a view to system stability.

The degree of elevator application during turns depends upon the bank angle and the turn rate. The biasing effect upon the pitch rate gyroscope to achieve the proper elevator application depends largely upon the characteristics of the system. If the control components of the bank and turn sections of the system are essentially linear, it has been found that for angles of bank approaching 45° the elevator control requirement approximates a square-law function. Thus by applying a linear bias to each of the turn and bank gyroscopes, as is accomplished herein due to the biasing effects of such coils as RP1, RP2 and AP1, AP2 of the turn and bank gyroscope electromagnet systems, respectively, and a square-law up-elevator bias to the pitch gyroscope as afforded by unbiased coil UEP1, proportional or coordinated control surface applications may be obtained. The application of a direct-current bias on magnets of the turn and bank gyroscopes to obtain linear biasing forces and the utilization of an unbiased electromagnet which will obey the square-law on the pitch gyroscope has been proven effective. However, if linear response electromagnets are employed on the pitch gyroscope then, of course, a square-law network may be employed to furnish the exciting current. Similarly, the square-law control may be approached by using an up-elevator potentiometer and coil network connected the same as the pitch potentiometer and coil network, but in which the up-elevator potentiometer has a relatively high resistance compared with resistances of the associated coils of the network. This tends to produce flatness of response over the middle or balance range of the network approximating a square-law function. In any case regardless of the control characteristics of the turn and bank sections, the nature of the biases for the elevator system can be ascertained and means such as graded or tapered potentiometers, or a suitably calibrated network under the control of the hand wheel employed to produce the required elevator control. The method embodying a potentiometer in the elevator control section of sufficiently high resistance to provide the flat response characteristic over the middle range as above described is also known to be effective. It is deemed within the scope of this invention to employ any of the means described.

As noted in the general discussion of the opening pages of this specification, coordination of control for equilibrium throughout a simple turn requires proper proportioning of control surface application throughout the period of changing flight altitude when entering a turn, throughout the steady state condition when the proper bank angle is achieved and throughout the period of changing flight attitude when leaving the turn. Depending upon the inertia and the aerodynamic properties of a given aircraft, coordination of control may require a consideration of suitable delays in the application of rudder and up-elevator pending the accumulation of an angle of bank upon the application of the ailerons. Stated otherwise, it is usually desirable to control the application of the rudder so that it may be applied only in the amount required to produce the needed turn velocity for a given bank angle and to control the elevators so as to produce the needed pitch velocity for the given bank angle and turn rate. Otherwise, climbing may occur upon entering a turn and diving may occur upon leaving a turn. Similarly, skidding and side slipping may result upon entering and leaving a turn, these conditions resulting from premature application and removal of the elevators and rudder, respectively.

Fig. 11 shows a method of control coordination delaying the up-elevator and rudder application so that the application thereof occurs in time phase with the bank angle, eliminating any tendency to climb and skid upon entering a turn and the dive and slip upon straightening out. In this figure, parts corresponding to those of the preceding figures bear like reference characters.

The method is first to slow down the rudder rate by greater mechanical reduction from the rudder motor to the rudder than is utilized in the remaining control surface drives, as illustrated in the relative sizes of the gears employed in the rudder drive, the aileron drive and the elevator drive, RD, AD, and ED, respectively, or greater velocity feedback from the rudder motor armature circuit, or both. Additionally, the feedback voltage from the rudder potentiometer RP representing rudder position is reduced or eliminated, so that the rudder rate will be approximately proportional to the error velocity sensed by the turn rate gyroscope TG. This error is the full turn rate asked for if the hand wheel HW is turned quickly.

The second step is to use the rudder velocity voltage to bias the bank rate gyroscope. This is in addition to the pendulum bias of the bank rate gyroscope which is produced only if the proper bank angle has not been achieved. Assuming that such angle is continuously achieved, the bank voltage will be matched quickly by the aileron position feedback voltage of potentiometer AP. Thus the aileron angle will be proportional to rudder velocity. Now aileron angle is a measure of banking velocity, and rudder velocity is a measure of the rate of acquiring turn velocity, or in other words rudder velocity measures turn acceleration.

Bank velocity ∝ turn acceleration (actual). Integrating this expression gives:

Bank angle ∝ turn velocity (actual). This is close to the desired transient condition as far as bank and turn are concerned.

The third step is to delay the up-elevator or pitch rate so that it is acquired in phase with the bank angle and the actual turn rate. To do this, suitable square-law biases are applied to the pitch rate gyroscope in dependence of the asked for turn rate and the aileron angle or, alternatively, in dependence of the asked for turn rate and the rudder velocity. In each case the aileron angle bias and the rudder velocity biases are applied in opposition to the asked for turn rate bias and are each large at first but dying out as bank and turn are achieved. The up-elevator rate is proportional to the square of the difference between the asked for turn rate and bank velocity. The full up-elevator or pitch rate is, therefore, not achieved until maximum bank (zero bank velocity) is achieved.

In Fig. 11, the majority of the control will be understood from the discussions concerning Figs. 8, 9 and 10. Hence, the following description is directed primarily to the various features hereinbefore noted. The velocity feedback voltage from the rudder motor armature circuit to the turn rate gyroscope is taken from the pair of terminals T1 of the bridge circuit in which the rudder motor armature winding is included as a leg and applied across the series connected coils RV1 and RV2. This velocity feedback voltage is relatively greater than that fed back from the aileron and elevator motors. Assuming equal machine sizes of the components of the three servo systems, the resistors R12 and R13 connected in series in the velocity feedback circuits of the aileron and elevator sections of the system, there being none or a fairly low value in the velocity feedback circuit of the rudder section, constitute voltage dropping means for lowering the velocity feedback voltages applied across the pairs of coils BV1, BV2 and EV1, EV2, respectively, in the biasing magnets of the bank and pitch gyroscopes, below that applied to the coils RV1 and RV2 of the turn gyroscope. Thus a greater suppression of rudder control is had for a given set of conditions than is had for the ailerons and the elevators.

The connection and control of the rudder potentiometer for energizing coils RP1 and RP2 in dependence of rudder position remains unchanged. However, the feedback voltage of the rudder potentiometer RP is reduced to cause rudder velocity to be more nearly proportional to the asked for turn rate indicated by the handwheel or the error velocity sensed by the turn rate gyroscope. If desired, the rudder position feedback circuits may be eliminated. The remainder of the biasing system for the turn rate gyroscope including the pairs of coils TP1, TP2, controlled by the turn potentiometer TP and CU1, CU2 energized by the course control unit CU, indicated as a block for simplifying the illustration, is the same as that for the preceding figures.

The magnetic biasing means for the bank gyroscope again includes the pairs of coils AP1, AP2 and BV1, BV2 energized, respectively, by the aileron potentiometer AP and the bank voltage potentiometer BVP and the function thereof is unchanged. The rudder velocity feedback is accommodated on an additional pair of coils RV3 and RV4 which are arranged to bias the bank rate gyroscope about its precession axis in a direction to initiate aileron operation in the proper direction. It will be remembered that this velocity signal is large at first and diminishes as the rudder approaches equilibrium position. The rudder velocity voltage for coils RV3 and RV4 of the bank gyroscope is taken from a potentiometer P5 which is connected across the output terminals of the rudder motor bridge circuit.

The pitch gyroscope biasing system again includes the pair of coils PP1, PP2 energized by the pitch potentiometer PP, the pair of coils EV1, EV2 energized by the elevator velocity feedback voltage, the pair of coils EP1, EP2 energized by the potentiometer EP operated by the elevator servo system, and the pair of coils C1 and C2 affording predetermined bias on the magnet section including coils VR5 and VR6 energized by the vertical rate control system VRC. The function of this portion of the control is similar to that, for example, of Fig. 10.

The square law control of the pitch gyroscope for up-elevator application is obtained by means of an unbiased electromagnet including the turn velocity coil TV1 and the aileron position coil AP1. A potentiometer TV driven by rotative movement of handwheel HW controls the energization of coil TV1 and has its extremities connected across the positive and negative supply conductors. The movable tap of the turn velocity potentiometer is connected to one side of the coil TV1 while the other side of coil TV1 is connected to the center point of the turn velocity potentiometer. As so arranged operation of the movable tap to either side of the center tapped point increases the voltage applied to the coil TV1 and, although the polarity of the voltage reverses on opposite sides of the center tap, the pull of the magnet is unidirectional. Coil AP3 is similarly connected between a center tap of potentiometer AP and the movable tap thereof and is energized in a sense to subtract from the M. M. F. of coil TV1. The voltage applied to coil AP3 is large at first during the period of aileron displacement producing the desired bank angle for the asked for turn rate and drops to zero as the proper bank angle is achieved and the ailerons returned to streamlined position by the action of the bank rate gyroscope. Hence upon rotation of the handwheel the biasing effect of the coil TV1 is sufficiently neutralized by that of coil AP3 to prevent over-application of the elevators. As the bank angle is accumulated and the ailerons are moved towards streamlined position, the movable tap of potentiometer AP is moved towards its center position decreasing the excitation of coil AP3. Accordingly, in view of the increasingly predominating effect of coil TV1 the application of up-elevator increases.

Assuming now that the system is operating and the handwheel centered rotatably and axially, the system will function to stabilize the aircraft about all three of the control axes thereof. Angular velocity of the aircraft about the yaw or turn axis thereof is detected by the turn rate gyroscope, the output of which drives the rudder servo system and the rudder in a direction to check the yaw velocity. The velocity feedback voltage of the rudder motor armature circuit being fed back in a negative sense and being large in the first instant affords a large measure of velocity damping, and since the position feedback voltage of the rudder potentiometer is now reduced or eliminated the rudder rate is approximately proportional to the error velocity in yaw detected by the turn rate gyroscope. Due to the fact that velocity damping is high and the gear reduction through the rudder drive RD is larger than that of the other servo systems, the rate of rudder application is comparatively slower.

The rudder velocity voltage applied to the coils RV3 and RV4 by potentiometer P8 affords a high initial bias for the bank rate gyroscope BG effecting quick application of the ailerons in a sense corresponding to the turn velocity indicated by rudder motion. Since the velocity feedback of the aileron drive AD is less than that of the rudder section of the system, other things being assumed equal, the rate of aileron application for the given control condition exceeds that of the rudder. The signal of the bank voltage potentiometer BVP is again applied in series with the velocity feedback signal of the aileron motor armature circuit and functions as in the other figures but is comparatively smaller due to the present control of the turn gyroscope.

Since the foregoing control operations are initiated as a function of an assumed error velocity in yaw, it will be apparent that appreciable motion need not occur in the direction of the error or in correcting the error, the system functioning primarily to initiate torques opposing the detected error to, in effect, check the error velocity. Thus by the application of the ailerons in dependence of the turn velocity indicated by the rudder section of the system and the application of up-elevator in dependence of operation of the ailerons, the aircraft is maintained in equilibrium during the period of rudder application required to check the detected error velocity in yaw. As the error velocity diminishes the rudder velocity feedback signal diminishes. The ailerons follow the diminishing velocity signal of the rudder section to streamlined position driving the aileron position potentiometer to its center position. As a consequence the excitation of coil AP3 is removed and the response of the pitch gyroscope reverses the elevator servo system to return the elevators to their normal position.

Error velocities about the roll axis are detected by the bank rate gyroscope as described in connection with the preceding figures producing aileron application in response thereto. The elevators are again applied due to operation of the aileron position potentiometer. If the error velocity is essentially about the roll axis, the turn gyroscope will produce no appreciable control.

Pitch velocity is sensed as before by the pitch rate gyroscope to provide the necessary elevator application to check the error velocity in pitch and the vertical rate control due to its sensitivity to vertical components of pitch minimizes vertical excursions of the aircraft through its control of the pitch rate gyroscope.

To make a coordinated turn the handwheel HW is rotated introducing a bias to the turn rate gyroscope. The response of the turn rate gyroscope and the rudder rate approaches the full turn rate asked at the handwheel. The rudder velocity feedback voltage initiates aileron application and a velocity about the roll axis in a direction corresponding to rudder motion. Operation of the handwheel also actuates the movable tap of turn velocity potentiometer TV applying a voltage to coil TV1 of the square-law magnet biasing the pitch rate gyroscope tending to produce up-elevator application. The M. M. F. of coil TV1, however, is opposed by that of coil AP3 now energized by the aileron potentiometer AP. Thus due to the high velocity damping and gear ratio of the rudder section and the control of the elevator section by the aileron section, the rudder and elevator application is delayed pending the accumulation of bank angle affording proportional application and coordination of control surface movement for the indicated turn.

Since the function of the rudder velocity bias and the pendulum bias acting on the bank rate gyroscope are such as to provide the proper angles of bank throughout the period of changing flight attitude to the flight attitude indicated by the asked for turn rate at the handwheel, the rudder velocity voltage bias on the bank rate gyroscope is matched quickly by the aileron potentiometer position feedback bias and the aileron angle is proportional to rudder velocity. As previously shown, this is the condition in which bank angle is proportional to turn velocity which approaches the desired transient condition as far as bank and turn are concerned.

As the rudder approaches the position indicated by the position of the handwheel and turn potentiometer TP, the velocity of the rudder motor diminishes due to the increasing aerodynamic load on the rudder and at equilibrium position the rudder motor stops. Consequently, the rudder velocity voltage applied to the bank rate gyroscope dies out and the response of the pendulously mounted bank rate gyroscope returns the ailerons to streamlined position. As the ailerons are streamlined and the aileron potentiometer voltage applied to coil AP3 decreases, the biasing effect of coil TV1 becomes increasingly effective and the response of the pitch gyroscope increases the application of up-elevator. Thus it will be observed the up-elevator or pitch rate is proportional to the square of the difference between the asked for turn rate and bank velocity. The full up-elevator or pitch rate is therefore not achieved until the given bank angle (zero bank or roll velocity) occurs.

It will be appreciated that the system of Fig. 11 also provides complete coordination on the quick removal of turn rate at the handwheel for the actual turn rate will be diminished only as rapidly as the bank angle becomes zero, and the existing up-elevator will likewise persist but diminish only as fast as the angle of bank is reduced.

Fig. 12 differs from Fig. 11 only in the matter of the square law control of the electromagnet containing coil TV1 and covers the previously mentioned alternative for energizing this magnet. In this embodiment coil AP3 is now referred to as coil RV5 since it is energized by the rudder velocity voltage of potentiometer P9 which is connected across terminals T1 of the bridge circuit of the rudder motor RM. The biasing control afforded by this connection is similar to that afforded by the potentiometer AP being large at first and diminishing to zero as the aircraft achieves the desired turn rate, affording a delay of up-elevator application and the progressive application thereof as the turn rate increases.

It will be understood that the remaining components of Figs. 11 and 12 which have not been specifically described function in the manner set forth in Fig. 10.

While this invention has been illustrated as an electrical system, there are, of course, variations in the type of equipment which may be employed, for example, magnet operated hydraulic valves controlled by the gyroscope contact currents in hydraulic motor systems may be employed in place of the electrical system shown. Such a control appears in the copending application of S. J. Mikina, Serial No. 735,885, now Patent No. 2,597,164, filed on the same date as this application, entitled Control System, and assigned to the same assignee as this invention.

Additionally contact stacks of the type employed in the potentiometer regulator PR, or carbon piles may be substituted for the contacts. Also in certain instances, it is feasible to eliminate the generators of the various control sections of the system.

It is, therefore, intended that the foregoing disclosure and the showings made in the drawings, shall be interpreted only as illustrative and not in a limiting sense. The only limitations are to be determined from the scope of the appended claims.

I claim as my invention:

1. In a system for controlling the angular position of a body having freedom of angular movement about at least one axis, the combination of, motor means operable to control the angular position of said body about said axis, velocity responsive means responsive to the velocity of angular movement of said body about said axis, for producing an electrical quantity; means for applying said electrical quantity to said motor means to effect operation thereof, means responsive to the velocity of operation of said motor means for controlling the response of said velocity responsive means to the velocity of angular movement of said body about said axis, and means responsive to the operational position of said motor means for additionally controlling the response of said velocity responsive means to the velocity of angular movement of said body about said axis.

2. In a system for stabilizing a body having freedom of angular movement about an axis, the combination of, motor means operable to position said body about said axis, velocity responsive means responsive to the velocity of angular movement of the body about said axis for controlling the operation of said motor means, means responsive to the velocity of operation of said motor means, means responsive to the operational position of said motor means, means responsive to the positional error of said body with respect to a predetermined reference, and means for utilizing said means responsive to the velocity of operation of said motor means, said means responsive to the operational position of said motor means, and said means responsive to the positional error of the body with respect to a predetermined reference to control the response of said velocity responsive means.

3. Apparatus for stabilizing a craft about one of its axes of freedom, said craft having suitable control means operable to effect rotation thereof about said axis, comprising, in combination, electrically operated means for operating said control means, gyroscope means having the axes thereof disposed with respect to said one axis of said craft to have a precessional torque in dependence of the velocity of angular movement of said craft about said one axis, means responsive to the precessional movement of said gyroscope means for producing an electrical quantity for energizing said electrically operated means, and position reference means providing a position reference for said craft for biasing said gyroscope and effecting precessional movement thereof.

4. Apparatus for stabilizing a craft about one of its axes of freedom, said craft having suitable control means operable to effect rotation thereof about said axis, comprising, in combination, electrically operated means for operating said control means, gyroscope means having the axes thereof disposed with respect to said one axis of said craft to have a precessional torque in dependence of the velocity of angular movement of said craft about said one axis, means responsive to the precessional movement of said gyroscope means for producing an electrical quantity for energizing said electrically operated means, means responsive to the velocity of operation of said electrically operated means for precessing said gyroscope means, and means providing a position reference for said craft as a function of the angular error between said craft and said reference about said one axis, for biasing said gyroscope and effecting precessional movement thereof.

5. Apparatus for stabilizing a craft about one of its axes of freedom, said craft having suitable control means operable to effect rotation thereof about said axis, comprising, in combination, electrically operated means for operating said control means, gyroscope means having the axes thereof disposed with respect to said one axis of said craft to have a precessional torque in dependence of the velocity of angular movement of said craft about said one axis, means responsive to the precessional movement of said gyroscope means for producing an electrical quantity for energizing said electrically operated means, means responsive to the velocity of operation of said electrically operated means for biasing said gyroscope means and effecting precessional movement thereof, means responsive to the operational position of said electrically operated means for biasing said gyroscope means and effecting precessional movement thereof, and means providing a position reference for said craft as a function of the angular error between said craft and said reference about said one axis, for biasing said gyroscope means and effecting precessional movement thereof.

6. Apparatus for stabilizing a craft about one of its axes of freedom, said craft having suitable control means operable to effect rotation thereof about said axis, comprising, in combination, electrically operated means for operating said control means, gyroscope means having the axes thereof disposed with respect to said one axis of said craft to have a precessional torque in dependence of the velocity of angular movement of said craft about said one axis, means responsive to the precessional movement of said gyroscope means for producing an electrical quantity for energizing said electrically operated means, means responsive to the velocity of operation of said electrically operated means for biasing said gyroscope means and effecting precessional movement thereof, means responsive to the operational position of said electrically operated means for biasing said gyroscope means and effecting precessional movement thereof, manually adjustable means for biasing said gyroscope means and effecting precessional movement thereof to change the angular position of said craft about said one axis, and means providing a position reference for said craft as a function of the angular error between said craft and said reference about said one axis, for biasing said gyroscope means and effecting precessional movement thereof.

7. Apparatus for controlling the rudder of a craft having an electric motor for driving the rudder and an electrical control means for energizing the motor comprising, in combination, gyroscope means disposed to respond to the velocity of angular movement of the craft about its yaw axis, and to precess in proportion thereto, means responsive to the precessional movement of said gyroscope means for energizing said electrical control means, means responsive to the velocity of operation of said motor for biasing said gyroscope means about the axis of precession thereof, and means for biasing said gyroscope means about the precession axis thereof as a function of the angular position of said rudder.

8. Apparatus for controlling the rudder of a craft having an electric motor for driving the rudder and a generator for energizing the motor comprising, in combination, gyroscope means disposed to respond to the velocity of angular movement of the craft about its yaw axis, and to precess in proportion thereto, means responsive to the precessional movement of said gyroscope means for exciting said generator, means responsive to the velocity of operation of said motor for biasing said gyroscope means about the axis of precession thereof, means for biasing said gyroscope means about the precession axis thereof as a function of the angular position of said rudder, means providing a direction reference for said craft, and means for biasing said gyroscope means about the precession axis thereof as a function of the angular error of said craft with respect to said direction reference means.

9. In a system of control for a craft having steering means and an electrically operated servomechanism for operating said steering means, the combination of a gyroscope responsive to the velocity of angular movement of the craft about the axis of yaw thereof to precess in dependence thereof, means responsive to the precessional movement of the gyroscope for supplying electrical energy to said electrically operated servomechanism, electromagnetic means disposed to bias said gyroscope about the precessional axis thereof, means responsive to the velocity of operation of the servomechanism for energizing said electromagnetic means, and means for energizing said electromagnetic means as a function of the position of said steering means.

10. In a system of control for a craft having steering means and an electrically operated servomechanism for operating said steering means, the combination of a gyroscope responsive to the velocity of angular movement of the craft about the axis of yaw thereof to precess in dependence thereof, means responsive to the precessional movement of the gyroscope for supplying electrical energy to said electrically operated servomechanism, electromagnetic means disposed to bias said gyroscope about the precessional axis thereof, means responsive to the velocity of operation of the servomechanism for energizing said electromagnetic means, means for energizing said electromagnetic means as a function of the position of said steering means, and means for energizing said electromagnetic means as a function of the angular error in the instant heading of said craft with respect to the desired heading.

11. In a system of control for a craft having steering means and an electrically operated servomechanism for operating said steering means, the combination of a gyroscope responsive to the velocity of angular movement of the craft about the axis of yaw thereof to precess in dependence thereof, means responsive to the precessional movement of the gyroscope for supplying electrical energy to said electrically operated servomechanism, electromagnetic means disposed to bias said gyroscope about the precessional axis thereof, means responsive to the velocity of operation of the servomechanism for energizing said electromagnetic means, means for energizing said electromagnetic means as a function of the position of said steering means, and directional gyroscope means for energizing said electromagnetic means in dependence of the angular deviation of said craft in heading with respect to the heading of said directional gyroscope means.

12. In a system of control for a craft having steering means and an electrically operated servomechanism for operating said steering means, the combination of a gyroscope responsive to the velocity of angular movement of the craft about the axis of yaw thereof to precess in dependence thereof, means responsive to the precessional movement of the gyroscope for supplying electrical energy to said electrically operated servomechanism, electromagnetic means disposed to bias said gyroscope about the precessional axis thereof, means responsive to the velocity of operation of the servomechanism for energizing said electromagnetic means, means for energizing said electromagnetic means as a function of the position of said steering means, directional gyroscope means for energizing said electromagnetic means in dependence of the angular deviation of said craft in heading with respect to the heading of said directional gyroscope means, and means for energizing said electromagnetic means independently of all said aforenamed means for energizing said electromagnetic means, to effect a change in course of said craft.

13. In a system for controlling a body about one of its axes of freedom, said body having electrically operated servo means for effecting motion of the body about said one axis, the combination of, gyroscope means disposed to respond to the velocity of angular motion of the body about said one axis and having a precessional torque about the precessional axis thereof in dependence of said velocity of angular motion, means responsive to the precessional torque of said gyroscope means for energizing said electrically operated servo means, and position responsive biasing means for applying biasing torques about said precessional axis and controlling the precessional movement of the gyroscope means in dependence of the angular position of the body about said one axis with respect to a predetermined reference position.

14. In a system for controlling a body about one of its axes of freedom, said body having electrically operated servo means for effecting motion of the body about said one axis, the combination of, gyroscope means disposed to respond to the velocity of angular motion of the body about said one axis and having a precessional torque about the precessional axis thereof in dependence of said velocity of angular motion, electrical means responsive to the precessional torque of said gyroscope means for energizing said electrically operated servo means, biasing means responsive to the operating position of said servo means for applying biasing torques about said precessional axis and controlling the precessional movement of the gyroscope in dependence of the operating position of said servo means, and biasing means responsive to the operating position of said body for applying biasing torques about said precessional axis and controlling the precessional movement of the gyroscope means in dependence of the position of the body about said one axis with respect to a predetermined reference position.

15. In a system for controlling a body about one of its axes of freedom including operating means for effecting motion of the body about said one axis, the combination of, a gyroscope supported on said body for precessional movement about the precessional axis of the gyroscope in dependence of the velocity of angular movement of the body about said one axis, motion limiting means for limiting the precessional movement of the gyroscope, means responsive to precessional movement of the gyroscope for controlling said operating means, and biasing means responsive to the position of said body for applying biasing torques about said precessional axis and controlling the precessional movement of the gyroscope about the precession axis thereof in dependence of the angular position of the body with respect to a predetermined reference position.

16. In a system for controlling a body about one of its axes of freedom including operating means for effecting motion of the body about said one axis, the combination of, a gyroscope supported on said body for precessional movement about the precessional axis of the gyroscope in dependence of the velocity of angular movement of the body about said one axis, stop means for limiting the precessional movement of the gyroscope, means responsive to precessional movement of the gyroscope for controlling said operating means, biasing means responsive to the operating position of said operating means for applying biasing torques about said precessional axis and controlling the precessional movement of the gyroscope, and biasing means responsive to the position of said body for applying biasing torques about said precessional axis and controlling the precessional movement of the gyroscope in dependence of the angular position of the body with respect to a predetermined reference position.

17. In a system for controlling a body about one of its axes of freedom including operating means for effecting motion of the body about said one axis, the combination of, a gyroscope supported on said body for precessional movement about the precessional axis of the gyroscope in dependence of the velocity of angular movement of the body about said one axis, stop means for limiting the precessional movement of the gyroscope, control means responsive to precessional movement of the gyroscope for controlling said operating means, biasing means responsive to the operating position of said operating means for controlling the precessional movement of said gyroscope about the precessional axis thereof, biasing means responsive to the velocity of operation of said operating means for controlling the precessional movement of said gyroscope about the precessional axis thereof, and biasing means for controlling the precessional movement of the gyroscope about the precession axis thereof in dependence of the angular position of the body with respect to a predetermined reference position.

18. In a system for controlling a body about one of its axes of freedom including operating means for effecting motion of the body about said one axis, the combination of, a gyroscope supported on the body for precessional movement about the precessional axis of the gyroscope in response to the velocity of angular movement of the body about said one axis, stop means for limiting the precessional movement of the gyroscope about its precessional axis, control means responsive to precessional movement of the gyroscope for controlling said operating means, a linear pull electromagnet mechanically connected with said gyroscope for applying a linear biasing force to said gyroscope about the precession axis thereof independently of the position of the gyroscope about the precession axis thereof, and adjustable electrical control means for controlling the energization of said electromagnet.

19. In a system for controlling a body about one of its axes of freedom including operating means for effecting motion of the body about said one axis, the combination of, a gyroscope supported on the body for precessional movement about the precessional axis of the gyroscope in response to the velocity of angular movement of the body about said one axis, stop means for limiting the precessional movement of the gyroscope about its precessional axis, control means responsive to precessional movement of the gyroscope for controlling said operating means, biasing means connected with said gyroscope for applying a linear biasing force to said gyroscope about the precession axis thereof independently of the position of the gyroscope about the precession axis thereof, control means responsive to the operating position of said operating means for controlling said biasing means, and additional control means for controlling the said biasing means in response to the angular position of said body with respect to a reference position.

20. In a system for controlling a body about one of its axes of freedom including operating means for effecting motion of the body about said one axis, the combination of, a gyroscope supported on the body for precessional movement about the precessional axis of the gyroscope in response to the velocity of angular movement of the body about said one axis, stop means for limiting the precessional movement of the gyroscope about its precessional axis, control means responsive to precessional movement of the gyroscope for controlling said operating means, biasing means for applying a linear biasing force to said gyroscope about the precession axis thereof independently of the position of the gyroscope about the precession axis thereof, means responsive to the operating position of said operating means for controlling said biasing means, means responsive to the velocity of operation of said operating means for controlling said biasing means, and means for controlling the said biasing means in response to the angular position of said body with respect to a reference position.

21. In a system for controlling a body about one of its axes of freedom including operating means for effecting motion of the body about said one axis, the combination of, a gyroscope supported on the body for precessional movement about the precessional axis of the gyroscope in response to the velocity of angular movement of the body about said one axis, stop means for limiting the precessional movement of the gyroscope about its precessional axis, control means responsive to precessional movement of the gyroscope for controlling said operating means, biasing means for applying a linear biasing force to said gyroscope about the precession axis thereof independently of the position of the gyroscope about the precession axis thereof, means responsive to the operating position of said operating means for controlling said biasing means, means responsive to the velocity of operation of said operating means for controlling said biasing means, manually operated means for controlling said biasing means, and means for controlling said biasing means in response to the angular position of said body with respect to a reference position.

22. In a system of control for an aircraft having a movable control surface for effecting movement of the aircraft about an axis thereof, the combination of, a motor having a rotor winding, for driving said movable control surface; an electrical bridge circuit including said rotor winding as one leg, said bridge circuit being balanced when the rotor winding is stationary and being unbalanced when the rotor winding is rotating, due to the back E. M. F. generated; electrical means for energizing the bridge circuit, a gyroscope having freedom of movement about the precessional axis thereof and supported on said aircraft to precess in dependence of the velocity of angular movement of the aircraft about said axis, contact means actuated by precessional movement of said gyroscope, circuit means including said contact means for controlling said electrical means, electromagnetic means for biasing said gryoscope about the precession axis thereof, and means responsive to the electrical unbalance of said bridge circuit for energizing said electromagnetic means.

23. In a system of control for an aircraft having a movable control surface for effecting movement of the aircraft about an axis thereof, the combination of, a motor having a rotor winding, for driving said movable control surface; an electrical bridge circuit including said rotor winding as one leg, said bridge circuit being balanced when the rotor winding is stationary and being unbalanced when the rotor winding is rotating, due to the back E. M. F. generated; a generator for energizing the bridge circuit, field winding means for exciting the generator, a gyroscope having freedom of movement about the precessional axis thereof and supported on said aircraft to precess in dependence of the velocity of angular movement of the aircraft about said axis, contact means actuated by precessional movement of said gyroscope, circuit means including said contact means for energizing said field winding means, electromagnetic means for biasing said gyroscope about the precession axis thereof, means responsive to the electrical unbalance of said bridge circuit for energizing said electromagnetic means, and means responsive to the position of said movable control surface for energizing said electromagnetic means.

24. In a system of control for an aircraft having a movable control surface for effecting movement of the aircraft about an axis thereof, the combination of, a motor having a rotor winding, for driving said movable control surface; an electrical bridge circuit including said rotor winding as one leg, said bridge circuit being balanced when the rotor winding is stationary and being unbalanced when the rotor winding is rotating, due to the back E. M. F. generated; a generator for energizing the bridge circuit, field winding means for exciting the generator, a gyroscope having freedom of movement about the precessional axis thereof and supported on said aircraft to precess in dependence of the velocity of angular movement of the aircraft about said axis, contact means actuated by precessional movement of said gyroscope, circuit means including said contact means for energizing said field winding means, electromagnetic means for biasing said gyroscope about the precession axis thereof, means responsive to the electrical unbalance of said electrical bridge circuit for producing an electrical quantity, means responsive to the position of said movable control surface for producing an electrical quantity, means for producing an electrical quantity in response to the angular departure of said aircraft about said axis from a reference position, and means for applying all said electrical quantities to said electromagnetic means.

25. Apparatus as set forth in claim 24 and in addition, means for limiting the precessional movement of said gyroscope within limits sufficiently in excess of movement required for contact closure to provide proper contact operation.

26. In a directional control system for an aircraft having a rudder for effecting movement of the aircraft about the yaw axis thereof, the combination of, a motor having a rotor winding, for driving said rudder; an electrical bridge circuit including said rotor winding as one leg thereof, said bridge circuit being balanced when the rotor winding is stationary and being unbalanced in dependence of the back E. M. F. developed during rotation of the rotor winding, generator for energizing the bridge circuit, field winding means for exciting the generator, gyroscope supported on said aircraft with the gyroscope spin axis substantially paralleling the pitch axis of the aircraft, and the gyroscope precession axis substantially paralleling the longitudinal axis of the aircraft, means constructed and arranged to limit angular precessional movement of the gyroscope about the precession axis thereof, means responsive to the precessional movement of the gyroscope for energizing said field winding means of said generator, electromagnetic means for biasing said gyroscope about the precession axis thereof, gyroscope stabilized compass means for producing electrical quantities in dependence of the error in heading of said aircraft with respect to a predetermined heading, means responsive to the angular position of said rudder for producing electrical quantities, means for producing electrical quantities in dependence of the electrical unbalance of said bridge circuit, and means for applying all said electrical quantities to said electromagnetic means.

27. Stabilizing apparatus for a body having freedom of angular movement about a given axis comprising, in combination, a gyroscope arranged on said body to respond to motion of the body about said axis of freedom, control means responsive to said gyroscope for controlling said body about said axis of freedom, and biasing means for said gyroscope responsive to the velocity of operation of said control means.

28. In a control for stabilizing an aircraft about the roll axis thereof, said aircraft having ailerons for effecting movement thereof about said roll axis, the combination of, motor means for driving said ailerons, a gyroscope, mounting means providing a precession axis for said gyroscope which is removed from the center of gravity of the gyroscope, said mounting means being supported in said aircraft with gyroscopic precession axis in a substantially vertical position with respect to the aircraft, stop means limiting precessional movement of the gyroscope to small angles, and regulating means operated by precessional movement of the gyroscope for controlling said motor means.

29. In a control for stabilizing an aircraft about the roll axis thereof, said aircraft having ailerons for effecting movement thereof about said roll axis, the combination of, a gyroscope pendulously mounted about a vertical precession axis in said aircraft to respond to the rate of angular movement of said aircraft about said roll axis, servo means responsive to the precessional movement of said gyroscope for controlling said ailerons, biasing means for biasing said gyroscope about said vertical precession axis, and means responsive to the velocity of operation of said servo means for controlling said biasing means.

30. In a control for stabilizing an aircraft about the roll axis thereof, said aircraft having ailerons for effecting movement of the aircraft about said roll axis, the combination of, a gyroscope, means supported by said aircraft forming a vertical pivot with respect to said aircraft about which said gyroscope moves, said vertical pivot constituting the precession axis of the gyroscope and being removed from the center of gravity of the gyroscope, the vertical pivot being disposed forward of the said center of gravity with respect to the direction of flight of the aircraft, servo means responsive to the precessional movement of the gyroscope for controlling said ailerons, biasing means for biasing said gyroscopes about said vertical pivot, means responsive to the velocity of operation of said servo means for controlling said biasing means, and means responsive to the operational position of said servo means for controlling said biasing means.

31. In a control for stabilizing an aircraft about the roll axis thereof, said aircraft having ailerons for effecting movement of the aircraft about said roll axis, the combination of, a gyroscope, means supported by said aircraft forming a vertical pivot with respect to said aircraft about which said gyroscope moves, said vertical pivot constituting the precession axis of the gyroscope and being removed from the center of gravity of the gyroscope, the vertical pivot being disposed forward of the said center of gravity with respect to the direction of flight of the aircraft, servo means responsive to the precessional movement of the gyroscope for controlling said ailerons, a pair of opposed electromagnets for biasing said gyroscope about said vertical pivot, each of said electromagnets having a pair of coils, means responsive to the velocity of operation of said servo means for energizing one coil of each electromagnet, means responsive to the operational position of said servo means for energizing the second coil of each electromagnet, the M. M. F.'s of the two coils on one electromagnet being opposed and the M. M. F.'s of the two coils on the other electromagnet being additive.

32. In a control for stabilizing an aircraft about the roll axis thereof, said aircraft having ailerons for effecting movement thereof about said roll axis, the combination of, a motor having a rotor winding, means connecting said motor to drive said ailerons, an electrical bridge circuit including said rotor winding, said electrical bridge circuit being balanced when said rotor winding is stationary and being unbalanced in dependence of the back E. M. F. generated upon rotation of the rotor winding, a generator connected to energize the electrical bridge circuit, a field winding for the generator, a gyroscope, means supported on said aircraft providing a vertical axis of precession for the gyroscope with respect to the aircraft, the spin axis of the gyroscope being substantially normal to the roll axis of the aircraft so that the gyroscope is responsive to angular velocities about the roll axis, means responsive to precessional movement of the gyroscope for exciting the generator field winding, and means for biasing said gyroscope about the precession axis thereof in dependence of the electrical unbalance of said bridge circuit.

33. In a control for stabilizing an aircraft about the roll axis thereof, said aircraft having ailerons for effecting movement thereof about said roll axis, the combination of, a motor having a rotor winding, means connecting said motor to drive said ailerons, an electrical bridge circuit including said rotor winding, said electrical bridge circuit being balanced when said rotor winding is stationary and being unbalanced in dependence of the back E. M. F. generated upon rotation of the rotor winding, a generator connected to energize the electrical bridge circuit, a field winding for the generator, a gyroscope, means supported on said aircraft for mounting said gyroscope for pivotal movement about an axis which is substantially vertical with respect to the aircraft and which axis is forward of the center of gravity of the gyroscope with respect to the direction of movement of the aircraft, the spin axis of the gyroscope being substantially normal to said roll axis so that the gyroscope is responsive to angular velocities about said roll axis, means responsive to precessional movement of the gyroscope about said vertical axis for exciting the generator field winding, and means for biasing said gyroscope about said vertical axis in dependence of the electrical unbalance of said bridge circuit.

34. In a control for stabilizing an aircraft about the roll axis thereof, said aircraft having ailerons for effecting movement thereof about said roll axis, the combination of, a motor having a rotor winding, means connecting said motor to drive said ailerons, an electrical bridge circuit including said rotor winding, said electrical bridge circuit being balanced when said rotor winding is stationary and being unbalanced in dependence of the back E. M. F. generated upon rotation of the rotor winding, a generator connected to energize the electrical bridge circuit, a field winding for the generator, a gyroscope, means supported on said aircraft for mounting said gyroscope for pivotal movement about an axis which is vertical with respect to the aircraft and which axis is forward of the center of gravity of the gyroscope with respect to the direction of movement of the aircraft, the spin axis of the gyroscope being normal to said roll axis so that the gyroscope is responsive to angular velocities about said roll axis, means responsive to precessional movement of the gyroscope about said vertical axis for exciting the generator field winding, means for producing an electrical quantity in dependence of the electrical unbalance of said bridge circuit, means for producing an electrical quantity in dependence of the angular position of said ailerons, electromagnetic means for biasing said gyroscope about said vertical axis, and means for applying said electrical quantities to said electromagnetic means.

35. In a system for controlling the movement of an aircraft about the pitch axis thereof, the combination of, a gyroscope disposed in said aircraft to precess about the precession axis thereof in dependence of the velocity of movement of the aircraft about the pitch axis thereof, means responsive to precessional movement of the gyroscope for controlling movement of the aircraft about said pitch axis, electromagnetic means for biasing said gyroscope about said precession axis, and manually operated means for controlling the energization of said electromagnetic means.

36. In a system for controlling the movement of an aircraft about the pitch axis thereof, the combination of, a gyroscope disposed in said aircraft to precess in dependence of the velocity of movement of the aircraft about the pitch axis thereof, servo means responsive to precessional movement of the gyroscope for controlling movement of the aircraft about said pitch axis, and electromagnetic means for biasing said gyroscope about the precession axis thereof as a function of the rate of change of elevation of said aircraft.

37. In a system for controlling the movement of an aircraft about the pitch axis thereof, the combination of, a gyroscope disposed in said aircraft to precess about the precession axis thereof in dependence of the velocity of movement of the aircraft about the pitch axis thereof, means responsive to precessional movement of the gyroscope for controlling movement of the aircraft about said pitch axis, and means for biasing said gyroscope about the precession axis thereof in dependence of the movement of the aircraft about another control axis thereof.

38. In a system for controlling the movement of an aircraft about the pitch axis thereof, the combination of, a gyroscope disposed in said aircraft to precess about the precession axis thereof in dependence of the velocity of movement of the aircraft about the pitch axis thereof, means responsive to precessional movement of the gyroscope for controlling movement of the aircraft about said pitch axis, means for biasing said gyroscope about the precession axis thereof as a function of the rate of change of elevation of said aircraft, and means for additionally biasing said gyroscope about the precession axis thereof in dependence of the movement of the aircraft about the roll axis thereof.

39. In a system for controlling the movement of an aircraft about the pitch axis thereof, the combination of, a gyroscope disposed in said aircraft to precess about the precession axis thereof in dependence of the velocity of movement of the aircraft about the pitch axis thereof, means responsive to precessional movement of the gyroscope for controlling movement of the aircraft about said pitch axis, means for biasing said gyroscope about the precession axis thereof as a function of the rate of change of elevation of the aircraft, means for producing a control quantity in dependence of the rate of movement of said aircraft about the roll axis thereof, said control quantity being of one sense or of an opposite sense depending upon the direction of movement about said roll axis, and means for applying a unidirectional bias to said gyroscope about the precession axis thereof in dependence of the magnitude of said control quantity and irrespective of the sense thereof.

40. In a system for controlling the movement of an aircraft about the pitch axis thereof, the aircraft having elevators for effecting movement thereof about said pitch axis, the combination of, a motor having an armature winding and a field winding, means for exciting the field winding, a bridge circuit including the armature winding as one leg thereof, said bridge circuit being normally balanced when said armature winding is stationary and being unbalanced in dependence of the impedance change of the armature winding during rotation thereof, means connecting the motor to drive said elevators, electrical means for energizing the bridge circuit, a gyroscope secured to said aircraft and having freedom of movement only about the precession axis thereof, said gyroscope being oriented in said aircraft to respond in its precessional movement to the velocity of movement of the aircraft about said pitch axis, and means for biasing said gyroscope about the precession axis thereof in dependence of the unbalance of said bridge circuit.

41. In a system for controlling the movement of an aircraft about the pitch axis thereof, the aircraft having elevators for effecting movement thereof about said pitch axis, the combination of, a motor having an armature winding and a field winding, means for exciting the field winding, a bridge circuit including the armature winding as one leg thereof, said bridge circuit being normally balanced when said armature winding is stationary and being unbalanced in dependence of the impedance change of the armature winding during rotation thereof, means connecting the motor to drive said elevators, electrical means for energizing the bridge circuit, a gyroscope secured to said aircraft and having freedom of movement only about the precession axis thereof, said gyroscope being oriented in said aircraft to respond in its precessional movement to the velocity of movement of the aircraft about said pitch axis, means for biasing said gyroscope about the precession axis thereof in dependence of the unbalance of said bridge circuit, and means for biasing said gyroscope about the precession axis thereof in dependence of the angular position of said elevators.

42. In a system for controlling the movement of an aircraft about the pitch axis thereof, the aircraft having elevators for effecting movement thereof about said pitch axis, the combination of, a motor having an armature winding and a field winding, means for exciting the field winding, a bridge circuit including the armature winding as one leg thereof, said bridge circuit being normally balanced when said armature winding is stationary and being unbalanced in dependence of the impedance change of the armature winding during rotation thereof, means connecting the motor to drive said elevators, electrical means for energizing the bridge circuit, a gyroscope secured to said aircraft and having freedom of movement about the precession axis thereof, said gyroscope being oriented in said aircraft to respond in its precessional movement to the velocity of movement of the aircraft about said pitch axis, means for biasing said gyroscope about the precession axis thereof in dependence of the unbalance of said bridge circuit, means for biasing said gyroscope about the precession axis thereof in dependence of the angular position of said elevators and means for producing a unidirectional signal indicative of turning movement of said aircraft in each direction for biasing said gyroscope about the precession axis thereof.

43. In a system for controlling a body movable in space, about an axis of freedom thereof, the combination of, a gyroscope assembly including a rotor, gimbal means mounting said rotor for rotation about the spin axis thereof, bearing means forming a gimbal axis supporting said gimbal means for rotation about an axis normal to said spin axis, a stationary contact, a movable contact disposed to be operated by said gimbal means, to and from positions engaging said stationary contact; said rotor having a non-uniform mass distribution axially thereof for unbalancing said rotor to produce a dynamic torque couple about said gimbal axis during rotor rotation, means securing said gyroscope assembly to said body with both of said spin and gimbal axes substantially normal to the said axis of freedom of the body, and electrically operated means operatively associated with said stationary and movable contacts for controlling said body about said axis of freedom.

44. In a system for controlling a body movable in space, about an axis of freedom thereof, the combination of, a gyroscope assembly including a rotor, gimbal means mounting said rotor for rotation about the spin axis thereof, bearing means forming a gimbal axis supporting said gimbal means for rotation about an axis normal to said spin axis, a stationary contact, a movable contact disposed to be operated by said gimbal means, to and from positions engaging said stationary contact, said rotor having a non-uniform mass distribution axially thereof for unbalancing said rotor to produce a dynamic torque couple about said gimbal axis during rotor rotation, means securing said gyroscope assembly to said body with both of said spin and gimbal axes substantially normal to the said axis of freedom of the body, means for producing a torque about said gimbal axis as a function of the angular deviation of said body about said axis of freedom with respect to a reference position, and electrically operated means operatively associated with said stationary and movable contacts for controlling said body about said axis of freedom.

45. In a system for controlling a body movable in space, about an axis of freedom thereof, the combination of, a gyroscope assembly including a rotor, gimbal means mounting said rotor for rotation about the spin axis thereof, bearing means forming a gimbal axis supporting said gimbal means for rotation about an axis normal to said spin axis, a stationary contact, a movable contact disposed to be operated by said gimbal means, to and from positions engaging said stationary contact, said rotor having a non-uniform mass distribution axially thereof for unbalancing said rotor to produce a dynamic torque couple about said gimbal axis during rotor rotation, means securing said gyroscope assembly to said body with both of said spin and gimbal axes normal to the said axis of freedom of the body, an electromagnet including a coil and a core, an armature of the form of a sleeve surrounding said core in spaced relation therewith adjacent an extremity of said coil, means connecting said armature with said gimbal means, means for energizing said coil, and means operatively associated with said stationary and movable contacts for controlling said body about said axis of freedom.

46. Apparatus as set forth in claim 45 in which said means for energizing said coil comprises, means for producing an electrical quantity as a function of the vertical rate of change of position of said body, and means for applying said electrical quantity to said coil.

47. Apparatus as set forth in claim 45 in which said last named means comprises, means for supplying power, an electric servo system, circuit means connecting said contacts with said power supply and said servo system to control the operation of the servo system, and means operated by the servo system for controlling said body about said axis of freedom.

48. In a system for controlling a body movable in space, about an axis of freedom thereof, the combination of, a gyroscope assembly including a rotor, gimbal means mounting said rotor for rotation about the spin axis thereof, bearing means forming a gimbal axis supporting said gimbal means for rotation about an axis normal to said spin axis, means securing said bearing means to said body with both of said spin and gimbal axes substantially normal to the said axis of freedom of said body, a stationary contact, a movable contact disposed to be operated by said gimbal means upon movement thereof about said gimbal axis, to and from positions engaging said stationary contact, means operatively associated with said stationary and movable contacts for controlling said body about said axis of freedom, electromagnetic means including a coil and a core of magnetic material, an armature member of magnetic material constructed and arranged to encompass said core adjacent one extremity of said coil, means securing said armature member to said gimbal means so that movement of said armature along said core effects rotation of said gimbal means, a manually operable control member, electrical means operated by said control member for producing an electrical quantity in dependence of movement of the control member, and circuit means connecting said electrical means with said coil to effect energization thereof.

49. In a system for controlling a body movable in space, about an axis of freedom thereof, the combination of, a gyroscope assembly including a rotor, gimbal means mounting said rotor for rotation about the spin axis thereof, bearing means forming a gimbal axis supporting said gimbal means for rotation about an axis normal to said spin axis, means securing said bearing means to said body with both of said spin and gimbal axes normal to the said axis of freedom of said body, a stationary contact, a movable contact disposed to be operated by said gimbal means upon movement thereof about said gimbal axis, to and from positions engaging said stationary contact, means unbalancing said rotor to produce a dynamic torque couple about said gimbal axis during rotor rotation, means operatively associated with said stationary and movable contacts for controlling said body about said axis of freedom, electromagnetic means including a coil and a core of magnetic material, an armature member of magnetic material constructed and arranged to encompass said core adjacent one extremity of said coil, means securing said armature member to said gimbal means so that movement of said armature along said core effects rotation of said gimbal means, a manually operable control member, electrical means operated by said control member for producing an electrical quantity in dependence of movement of the control member, and circuit means connecting said electrical means with said coil to effect energization thereof.

50. In a system responsive to the angular position of a body about a given axis, the combination of, a rate gyroscope disposed to respond to the velocity of motion of the body about said given axis, servo means responsive to said rate gyroscope for controlling said body about said given axis, biasing magnets for controlling the responsive of the rate gyroscope to the velocity of motion of said body about said axis, and means for energizing said biasing magnets in dependence of an operating quantity of said servo means.

51. In a system responsive to the angular position of a body about a given axis, the combination of, a restrained gyroscope having limited precessional motion, disposed to respond to the velocity of motion of said body about said given axis and produce precessional torques about the precession axis thereof in dependence of said velocity of motion; magnets for biasing said gyroscope about its axis of precessional motion, a control member operated by the system of magnets and the gyroscope, servo means operated by the control member for controlling the body about the given axis, and means responsive to the velocity of operation of the servo means for energizing the biasing magnets.

52. In a system responsive to the angular position of a body about a given axis, the combination of, a restrained gyroscope having limited precessional motion, disposed to respond to the velocity of motion of said body about said given axis and produce precessional torques about its precessional axis in dependence of said velocity of motion, magnets for biasing said gyroscope about its precession axis, a control member operated by the system of magnets and the gyroscope, servo means operated by the control member for controlling the body about the given axis, and means responsive to the operational position of said servo means for energizing said biasing magnets.

53. In a system responsive to the angular position of a body about a given axis, the combination of, a restrained gyroscope having limited precessional motion, disposed to respond to the velocity of motion of said body bout said given axis and produce precessional torques about its precessional axis in dependence of said velocity of motion, magnets for biasing said gyroscope about its precession axis, a control member operated by the system of magnets and the gyroscopes, servo means operated by the control member for controlling the body about the given axis, means responsive to the velocity of operation of said servo means for energizing the biasing magnets, and means responsive to the operational position of the servo means for energizing the biasing magnets.

54. In a system of control for angularly positioning a body having freedom of angular movement about at least two axes, the combination of, motor means operable to control the angular position of said body about one of said axes, first velocity responsive means responsive to the velocity of angular movement of said body about said one axis, for producing a first electrical quantity in dependence of the velocity of said angular movement about said one axis; means for applying said first electrical quantity to said motor means, second velocity responsive means responsive to the velocity of angular movement of said body about the other of said two axes, for producing a second electrical quantity in dependence of the velocity of angular movement of the body about said other axis; and means for applying at least a portion of said second electrical quantity to said first velocity responsive means to control the response thereof to the velocity of angular movement of said body about said one axis.

55. In a system of control for angularly positioning a body having freedom of angular movement about at least two axes, the combination of, motor means operable to control the angular position of said body about one of said axes, first velocity responsive means responsive to the velocity of angular movement of said body about said one axis, for producing a first electrical quantity in dependence of the velocity of said angular movement about said one axis; means for applying said first electrical quantity to said motor means, second velocity responsive means responsive to the velocity of angular movement of said body about the other of said two axes, for producing a second electrical quantity in dependence of the velocity of angular movement of the body about said other axis; means for producing a transient electrical quantity in dependence of the velocity of operation of the first motor means, means combining at least a portion of said transient electrical quantity and said second electrical quantity to produce a regulating electrical quantity, and means responsive to said regulating electrical quantity for controlling the response of said first velocity responsive means to angular movements of said body and about said one axis.

56. In a system of control for angularly positioning a body having freedom of angular movement about at least two axes, the combination of, first and second motor means each operable to control the angular position of said body about one of said axes, first and second velocity responsive means, one for each axis, responsive to the velocity of angular movement of the body about the corresponding axis, for producing an electrical quantity in dependence of the angular velocity of the body about the corresponding axis; means for applying the electrical quantities produced by the first and second velocity responsive means, respectively, to the first and second motor means, means for producing additional electrical quantities in dependence of the velocity of operation of each of the first and second motor means; means for algebraically combining the additional electrical quantity of said first motor means with at least a part of the electrical quantity of said second velocity responsive means for controlling the response of said first velocity responsive means to the velocity of angular movement of the body about the axis thereof associated with the first velocity responsive means, means for algebraically combining the additional electrical quantity of said second motor means with at least a part of the electrical quantity of said first velocity responsive means for controlling the response of said second velocity responsive means to the velocity of angular movement of the body about the axis thereof associated with the second velocity responsive means, means for producing electrical quantities in response to the position of each of said first and second motor means, and means for applying the electrical position quantities of the first and second motor means, respectively to the first and second velocity responsive means for controlling the response of each thereof to the velocity of angular movement of the body about the axes thereof associated with each of said velocity responsive means.

57. In a system for stabilizing a body having freedom of angular movement about at least two axes, the combination of, first motor means operable to position said body about one of said axes, second motor means operable to position said body about the other of said axes, first velocity responsive means responsive to the velocity of angular movement of said body about said one axis, for producing a control quantity for the first motor means to control the operation thereof; second velocity responsive means responsive to the velocity of angular movement of the body about the other of said axes, for producing a control quantity for the second motor means to control the operation thereof, means for producing a regulating quantity in response to the velocity of operation of the first motor means, means for producing a regulating quantity in response to the velocity of operation of the second motor means, means for algebraically combining at least a part of the regulating quantity representative of velocity of operation of the first motor means with at least a part of the control quantity controlling the operation of the second motor means, for controlling said response of the first velocity responsive means; means for algebraically combining at least a part of the regulating quantity representative of velocity of operation of the second motor means with at least a part of the control quantity controlling operation of the first motor means, for controlling said response of the second velocity responsive means; means responsive to the positional error of the body about said one axis with respect to a predetermined reference, for controlling said response of the first velocity responsive means, and means responsive to the positional error of the body about said other axis with respect to a predetermined reference, for controlling said response of the second velocity responsive means.

58. In a system for stabilizing a body having freedom of angular movement about at least two axes, the combination of, first motor means operable to position said body about one of said axes, second motor means operable to position said body about the other of said axes, first velocity responsive means responsive to the velocity of angular movement of said body about said one axis, for producing a control quantity for the first motor means to control the operation thereof; second velocity responsive means responsive to the velocity of angular movement of the body about the other of said axes, for producing a control quantity for the second motor means to control the operation thereof, means for producing a regulating quantity in response to the velocity of operation of the first motor means, means for producing a regulating quantity in response to the velocity of operation of the second motor means, means for algebraically combining the regulating quantity representative of velocity of operation of the first motor means with the control quantity controlling the operation of the second motor means, for controlling said response of the first velocity responsive means; means for algebraically combining the regulating quantity representative of velocity of operation of the second motor means with the control quantity controlling operation of the first motor means, for controlling said response of the second velocity responsive means, means responsive to the operational position of the first motor means for controlling said response of the first velocity responsive means, means responsive to the operational position of the second motor means for controlling said response of the second velocity responsive means, means responsive to the positional error of the body about said one axis with respect to a predetermined reference, for controlling said response of the first velocity responsive means; and means responsive to the positional error of the body about said other axis with respect to a predetermined reference, for controlling said response of the second velocity responsive means.

59. In a system for stabilizing a body having freedom of angular movement about at least two axes, the combination of, first motor means operable to position said body about one of said axes, second motor means operable to position said body about the other of said axes, first velocity responsive means responsive to the velocity of angular movement of said body about said one axis, for producing a control quantity for the first motor means to control the operation thereof; second velocity responsive means responsive to the velocity of angular movement of the body about the other of said axes, for producing a control quantity for the second motor means to control the operation thereof, means for producing a regulating quantity in response to the velocity of operation of the first motor means, means for producing a regulating quantity in response to the velocity of operation of the second motor means, means for algebraically combining the regulating quantity representative of velocity of operation of the first motor means with the control quantity controlling the operation of the second motor means, for controlling said response of the first velocity responsive means; means for algebraically combining the regulating quantity representative of velocity of operation of the second motor means with the control quantity controlling operation of the first motor means, for controlling said response of the second velocity responsive means, means responsive to the operational position of the first motor means for controlling said response of the first velocity responsive means, means responsive to the operational position of the second motor means for controlling said response of the second velocity responsive means, means responsive to the positional error of the body about said one axis with respect to a predetermined reference, for controlling said response of the first velocity responsive means, means responsive to the positional error of the body about said other axis with respect to a predetermined reference, for controlling said response of the second velocity responsive means, and means for controlling each of said first and second velocity responsive means to effect changes in angular position of said body about the axes of freedom thereof.

60. In a system for controlling the angular position of a body about at least two axes including a motor having a rotor winding, in which the motor is operable to control the angular position of the body about one of said axes and having control means for angularly positioning the body about the other of said axes, the combination of, an electrical bridge circuit including said rotor winding as one leg thereof, said bridge circuit being balanced when said rotor winding is stationary and being unbalanced in magnitude and direction in dependence of the back E. M. F. when the rotor winding is rotating, the electrical unbalance of the bridge circuit being indicative of the velocity of rotation of the rotor winding, energizing means for said bridge circuit, first regulating means responsive to angular movement of said body about said one axis, for controlling the electrical output of said energizing means; means responsive to the electrical unbalance of said bridge circuit for controlling said first regulating means to control the response thereof to angular movement of the body about said one axis, and second regulating means responsive to angular movement of the body about said other axis, for controlling the first regulating means to control the response thereof to angular movement of the body about said one axis.

61. In a system for controlling the angular position of a body about at least two axes including a motor having a rotor winding, in which the motor is operable to control the angular position of the body about one of said axes and having control means for angularly positioning the body about the other of said axes, the combination of, an electrical bridge circuit including said rotor winding as one leg thereof, said bridge circuit being balanced when said rotor winding is stationary and being unbalanced in magnitude and direction in dependence of the back E. M. F. when the rotor winding is rotating, the electrical unbalance of the bridge circuit being indicative of the velocity of rotation of the winding, energizing means for said bridge circuit, first regulating means responsive to angular movement of said body about said one axis, for controlling the electrical output of said energizing means; means responsive to the electrical unbalance of said bridge circuit for controlling said first regulating means to control the response thereof to angular movement of the body about said one axis, means responsive to the angular disposition of said body about said one axis with respect to a reference position for controlling said first regulating means to modify the response thereof to angular movement of the body about said one axis, and second regulating means responsive to angular movement of the body about said other axis, for controlling the first regulating means to control the response thereof to angular movement of the body about said one axis.

62. In a system for controlling the angular position of a body about at least two axes including a motor having a rotor winding, in which the motor is operable to control the angular position of the body about one of said axes and having control means for angularly positioning the body about the other of said axes, the combination of, an electrical bridge circuit including said rotor winding as one leg thereof, said bridge circuit being balanced when said rotor winding is stationary and being unbalanced in magnitude and direction in dependence of the back E. M. F. when the rotor winding is rotating, the electrical unbalance of the bridge circuit being indicative of the velocity of rotation of the winding, energizing means for said bridge circuit, first regulating means responsive to angular movement of said body about said one axis, for controlling the electrical output of said energizing means; means responsive to the electrical unbalance of said bridge circuit for controlling said first regulating means to control the response thereof to angular movement of the body about said one axis, means responsive to the angular disposition of said body about said one axis with respect to a reference position for controlling said first regulating means to modify the response thereof to angular movement of the body about said one axis, means responsive to the rotational position of said motor for controlling said first regulating means to modify the response thereto to angular movement of the body about said one axis, and second regulating means responsive to angular movement of the body about said other axis, for controlling the first regulating means to control the response thereof to angular movement of the body about said one axis.

63. In a system for controlling the angular position of a body about at least two axes including a motor having a rotor winding, in which the motor is operable to control the angular position of the body about one of said axes and having control means for angularly positioning the body about the other of said axes, the combination of, an electrical bridge circuit including said rotor winding as one leg thereof, said bridge circuit being balanced when said rotor winding is stationary and being unbalanced in magnitude and direction in dependence of the back E. M. F. when the rotor winding is rotating, the electrical unbalance of the bridge circuit being indicative of the velocity of rotation of the winding, energizing means for said bridge circuit, first means responsive to the velocity of angular movement of the body about said one axis, for controlling the electrical output of said energizing means, second means responsive to the velocity of angular movement of the body about said other axis for producing a control quantity, means responsive to the electrical unbalance of said bridge circuit for producing a control quantity, means responsive to the rotational position of said motor for producing a control quantity, means responsive to the angular deviation of the body about said one axis with respect to a reference position for producing a control quantity, and means for utilizing all said control quantities in a control of said first means to modify the response thereof to angular movement of the body about said one axis.

64. In a system of control for stabilizing an aircraft about the yaw and roll axis, said aircraft having ailerons for effecting movement about the roll axis and a rudder for effecting movement about the yaw axis, the combination of, a rudder motor having an armature winding, an aileron motor having an armature winding, a first bridge circuit including the rudder motor armature winding as one leg and being electrically balanced when the rudder motor is stationary, a second bridge circuit including the aileron motor armature winding as one leg thereof and being normally balanced when the aileron motor is stationary, a rudder generator having a field winding, for energizing the first bridge circuit; an aileron generator having a field winding, for energizing the second bridge circuit, yaw regulating means responsive to the movement of the aircraft about the yaw axis for energizing the field winding of the rudder generator, roll regulating means responsive to the movement of the aircraft about the roll axis for energizing the field winding of the aileron generator, means for controlling the yaw regulating means in dependence of the energization of the field winding of the aileron generator, means for controlling the roll regulating means in dependence of the energization of the field winding of the rudder generator, means for controlling the yaw regulating means in dependence of the electrical unbalance of the first bridge circuit, and means for controlling the roll regulating means in dependence of the electrical unbalance of the second bridge circuit.

65. Apparatus as set forth in claim 64 in which said yaw regulating means comprises a gyroscope disposed to respond to the velocity of movement about the yaw axis and said roll regulating means comprises a gyroscope disposed to respond to the velocity of movement about the roll axis.

66. In a system of control for stabilizing an aircraft about the yaw and roll axis, said aircraft having ailerons for effecting movement about the roll axis and a rudder for effecting movement about the yaw axis, the combination of, a rudder motor having an armature winding, an aileron motor having an armature winding, a first bridge circuit including the rudder motor armature winding as one leg and being electrically balanced when the rudder motor is stationary, a second bridge circuit including the aileron motor armature winding as one leg thereof and being normally balanced when the aileron motor is stationary, a rudder generator having a field winding, for energizing the first bridge circuit; an aileron generator having a field winding, for energizing the second bridge circuit, yaw regulating means responsive to the movement of the aircraft about the yaw axis for energizing the field winding of the rudder generator, roll regulating means responsive to the movement of the aircraft about the roll axis for energizing the field winding of the aileron generator, means for controlling the yaw regulating means in dependence of the energization of the field winding of the aileron generator, means for controlling the roll regulating means in dependence of the energization of the field winding of the rudder generator, means for controlling the yaw regulating means in dependence of the electrical unbalance of the first bridge circuit, means for controlling the roll regulating means in dependence of the electrical unbalance of the second bridge circuit, means for additionally controlling the yaw regulating means in dependence of the said rudder and the heading of the aircraft with respect to a predetermined reference, and means for additionally controlling the roll regulating means in dependence of the position of said ailerons and the angular position of said aircraft about the roll axis with respect to the angle of equilibrium.

67. Apparatus as set forth in claim 66 in which said yaw regulating means comprises a gyroscope disposed to respond to the velocity of movement about the yaw axis and said roll regulating means comprises a gyroscope disposed to respond to the velocity of movement about the roll axis.

68. In a system of control for a body having freedom of angular movement about three axes, the combination of, first, second and third motor means, one for each axis, for controlling the angular position of said body about the axis associated therewith, first, second and third velocity responsive means, one for each axis, responsive to the velocity of angular movement of the body about the axis associated therewith, respectively, for controlling said first, second and third motor means; means responsive to said first velocity responsive means for controlling the response of said second velocity responsive means, and means responsive to said second velocity responsive means for controlling the response of said third velocity responsive means.

69. In a system of control for a body having freedom of angular movement about three axes, the combination of, first, second and third motor means, one for each axis, for controlling the angular position of said body about the axis associated therewith, first, second and third velocity responsive means, one for each axis, responsive to the velocity of angular movement of the body about the axis associated therewith, respectively, for controlling said first, second and third motor means; means responsive to said first velocity responsive means for controlling the response of said second velocity responsive means, means responsive to said second velocity responsive means for controlling the response of said first velocity responsive means, and means responsive to said second velocity responsive means for controlling the response of said third velocity responsive means.

70. In a system of control for a body having freedom of angular movement about three axes, the combination of, first, second and third motor means, one for each axis, for controlling the angular position of said body about the axis associated therewith, first, second and third velocity responsive means, one for each axis, responsive to the velocity of angular movement of the body about the axis associated therewith, respectively, for controlling said first, second and third motor means; means responsive to said first velocity responsive means for controlling the response of said second velocity responsive means, means responsive to said second velocity responsive means for controlling the response of said first velocity responsive means, means responsive to said second velocity responsive means for controlling the response of said third velocity responsive means, first, second and third means responsive, respectively, to the velocity of operation of said first, second and third motor means for controlling the response of said first, second and third velocity responsive means, respectively.

71. In a system of control for a body having freedom of angular movement about three axes, the combination of, first, second and third motor means, one for each axis, for controlling the angular position of said body about the axis associated therewith, first, second and third velocity responsive means, one for each axis, responsive to the velocity of angular movement of the body about the axis associated therewith, respectively, for controlling said first, second and third motor means; means responsive to said first velocity responsive means for controlling the response of said second velocity responsive means, means responsive to said second velocity responsive means for controlling the response of said first velocity responsive means, means responsive to said second velocity responsive means for controlling the response of said third velocity responsive means, first, second and third means responsive, respectively, to the velocity of operation of said first, second and third motor means for controlling the response of said first, second and third velocity responsive means, respectively; and first, second and third position responsive means responsive, respectively, to the operational position of said first, second and third motor means for controlling the response of said first, second and third velocity responsive means, respectively.

72. In a system for stabilizing a body having freedom of angular movement about three axes, the combination of, first, second and third motor means each associated with one axis and operable to angularly position the body about the corresponding axis; first, second and third velocity responsive means, respectively, corresponding to the first, second and third motor means, each associated with one axis, each being responsive to the velocity of angular movement of the body about the corresponding axis, for controlling the corresponding motor means; means responsive to the velocity of operation of each motor means for controlling the response of the corresponding velocity responsive means, means responsive to the operational position of each motor means for controlling the response of the corresponding velocity responsive means, and means, associated with each axis of the body, responsive to the positional error of the body with respect to a predetermined reference as a function of the angular position change of the body, for controlling the response of the corresponding velocity responsive means.

73. In a system for stabilizing a body having freedom of angular movement about three axes, the combination of, first, second and third motor means each associated with one axis and operable to angularly position the body about the corresponding axis; first, second and third velocity responsive means, respectively, corresponding to the first, second and third motor means, each associated with one axis, each being responsive to the velocity of angular movement of the body about the corresponding axis, for controlling the corresponding motor means; means responsive to the velocity of operation of each motor means for controlling the response of the corresponding velocity responsive means, means responsive to the operational position of each motor means for controlling the response of the corresponding velocity responsive means, position error means, associated with each axis of the body, responsive to the positional error of the body with respect to a predetermined reference as a function of the angular position change of the body, for controlling the response of the corresponding velocity responsive means; means for controlling the second velocity responsive means in dependence of the control afforded by the first velocity responsive means, means for controlling the first velocity responsive means in dependence of the control afforded by the second velocity responsive means, and means for controlling the third velocity responsive means in dependence of the control afforded by the second velocity responsive means.

74. In a system for stabilizing a body having freedom of angular movement about three axes, the combination of, first, second and third motor means each associated with one axis and operable to angularly position the body about the corresponding axis: first, second and third velocity responsive means, respectively, corresponding to the first, second and third motor means, each associated with one axis, each being responsive to the velocity of angular movement of the body about the corresponding axis, for controlling the corresponding motor means; means responsive to the velocity of operation of each motor means for controlling the response of the corresponding velocity responsive means, means responsive to the operational position of each motor means for controlling the response of the corresponding velocity responsive means; position error means, associated with each axis of the body, responsive to the positional error of the body with respect to a predetermined reference as a function of the angular position change of the body, for controlling the response of the corresponding velocity responsive means; means for controlling the second velocity responsive means in dependence of the control afforded by the first velocity responsive means, means for controlling the first velocity responsive means in dependence of the control afforded by the second velocity responsive means, means for controlling the third velocity responsive means in dependence of the control afforded by the second velocity responsive means, and means for additionally controlling each of said velocity responsive means to provide adjustment of the angular position of said body about said axes.

75. In a system for stabilizing a body having freedom of angular movement about three axes, the combination of, first, second and third motor means each associated with one axis and operable to angularly position the body about the corresponding axis; first, second and third velocity responsive means, respectively, corresponding to the first, second and third motor means, each associated with one axis, each being responsive to the velocity of angular movement of the body about the corresponding axis, for controlling the corresponding motor means; means responsive to the velocity of operation to each motor means for controlling the response of the corresponding velocity responsive means, and means associated with each axis of the body responsive to the positional error of the body with respect to a predetermined reference as a function of the angular position change of the body, for controlling the response of the corresponding velocity responsive means.

76. In an auto pilot for an aircraft having a turn control mechanism, a bank control mechanism and a pitch control mechanism, the combination of, velocity responsive means, one for each control axis of said aircraft, each for controlling the corresponding one of the turn, bank and pitch control mechanisms; and means for controlling said velocity responsive means for coordinating movement of said aircraft about the control axis thereof including means for imposing linear biasing forces on at least one of said velocity responsive means associated with said turn and said bank control means and for imposing square law biasing forces on the velocity responsive means associated with said pitch control mechanism.

77. In an auto pilot control for an aircraft having turn control means, bank control means and pitch control means, each for effecting movement of the aircraft about the corresponding one of the three control axes thereof, the combination of, turn regulating means, bank regulating means and pitch regulating means, each for controlling the corresponding one of the turn, bank and pitch control means and each being responsive to angular movement of the aircraft about the corresponding control axis for the aircraft, and means for coordinating movement of the aircraft about the control axes thereof including means for linearly controlling at least one of the turn and bank regulating means as a function of movement of the aircraft about the other of the turn and bank control axes and for applying a square law control to the pitch regulating means as a function of the angle of bank of the aircraft.

78. In an auto pilot control for an aircraft having turn control means, bank control means and pitch control means, each for effecting movement of the aircraft about the corresponding one of the three control axes thereof, the combination of, turn regulating means, bank regulating means and pitch regulating means, each for controlling the corresponding one of the turn, bank and pitch control means and each being responsive to angular movement of the aircraft about the corresponding control axis for the aircraft, means responsive to the bank regulating means for applying a linear control to the turn regulating means, and means responsive to the bank regulating means for applying a square law control to the pitch regulating means.

79. In an auto pilot control for an aircraft having turn control means, bank control means and pitch control means, each for effecting movement of the aircraft about the corresponding one of the three control axes thereof, the combination of, turn regulating means, bank regulating means and pitch regulating means, each for controlling the corresponding one of the turn, bank and pitch control means and each being responsive to angular movement of the aircraft about the corresponding control axis for the aircraft, means responsive to the turn regulating means for applying a linear control to the bank regulating means, and means responsive to the bank regulating means for applying a square law control to the pitch regulating means.

80. In an auto pilot control for an aircraft having turn control means, bank control means and pitch control means, each for effecting movement of the aircraft about the corresponding one of the three control axes thereof, the combination of, turn regulating means, bank regulating means and pitch regulating means, each for controlling the corresponding one of the turn, bank and pitch control means and each being responsive to angular movement of the aircraft about the corresponding control axis for the aircraft, means responsive to the turn regulating means for applying a linear control to the bank regulating means, means responsive to the bank regulating means for applying a linear control to turn regulating means, and means responsive to the bank regulating means for applying a square law control to the pitch regulating means.

81. In an auto pilot control for an aircraft having turn control means, bank control means and pitch control means, each for effecting movement of the aircraft about the corresponding one of the three control axes thereof, the combination of, a turn gyroscope, a bank gyroscope and a pitch gyroscope, each for controlling the corresponding one of the turn, bank and pitch control means, and each being responsive to the angular movement of the aircraft about the corresponding one of the control axes thereof, means for linearly biasing one of the turn and bank gyroscopes to effect a control thereof, and means for applying a square law bias to said pitch gyroscope to effect a control thereof.

82. In an auto pilot control for an aircraft having turn control means, bank control means and pitch control means, each for effecting movement of the aircraft about the corresponding one of the three control axes thereof, the combination of, a turn gyroscope, a bank gyroscope and a pitch gyroscope, each for controlling the corresponding one of the turn, bank and pitch control means, and each being responsive to the angular movement of the aircraft about the corresponding one of the control axes thereof, means for linearly biasing both of the turn and bank gyroscopes to effect a control thereof, and means for applying a square law bias to said pitch gyroscope to effect a control thereof.

83. In an auto pilot control for an aircraft having turn control means, bank control means and pitch control means, each for effecting movement of the aircraft about one of the control axes thereof, the combination of, a turn gyroscope, a bank gyroscope and a pitch gyroscope, each being movable about an output axis thereof in response to angular movement of the aircraft about the corresponding one of the three control axes, for controlling the corresponding one of the turn, bank and pitch control means; electromagnetic means for each of the turn and bank gyroscopes, having a linear response to energization thereof, for biasing the corresponding one of the turn and bank gyroscopes about the output axis thereof; electromagnetic means having a square-law response to energization thereof, for biasing the pitch gyroscope about the output axis thereof; and means for energizing all of said electromagnetic means.

84. Apparatus as set forth in claim 83 in which said first mentioned electromagnetic means each comprises, a core having a winding thereon, means for stationarily supporting said core with respect to the associated one of said gyroscopes, an armature member including an annulus of magnetic material concentrically disposed about said core, and means securing said armature to said gyroscope to rotate therewith about the precession axis thereof.

85. Apparatus as set forth in claim 83 in which said first mentioned electromagnetic means each comprises, a pair of core members disposed in coaxial relation having the confronting faces thereof spaced to form a small airgap therebetween, a winding on each core member, means for stationarily supporting each core member with respect to the associated one of said gyroscopes, an armature member including an annulus of magnetic material, concentrically disposed about said core members and straddling said airgap, and means securing said armature to said gyroscope to rotate therewith about the precession axis thereof.

86. In a system for controlling an aircraft about the yaw, roll and pitch axes thereof, the combination of, a turn gyroscope responsive to movement about the yaw axis, for producing a yaw control quantity corresponding in sense to the direction of movement of the aircraft about the yaw axis; a roll gyroscope responsive to movement about the pitch axis, for producing a roll control quantity corresponding in sense to the direction of movement of the aircraft about the roll axis; a pitch gyroscope responsive to movement about the pitch axis, for producing a pitch control quantity corresponding in sense to the direction of movement of the aircraft about the pitch axis; means for utilizing said yaw, roll and pitch control quantities, respectively, to control said aircraft about the yaw roll and pitch axes thereof, and control means for applying a unidirectional control to said pitch gyroscope in dependence of one of said yaw and roll control quantities irrespective of the sense of said one quantity.

87. In a system for controlling an aircraft about the yaw, roll and pitch axes thereof, the combination of, a turn gyroscope responsive to movement about the yaw axis, for producing a yaw control quantity corresponding in sense to the direction of movement of the aircraft about the yaw axis; a roll gyroscope responsive to movement about the pitch axis, for producing a roll control quantity corresponding in sense to the direction of movement of the aircraft about the roll axis; a pitch gyroscope responsive to movement about the pitch axis, for producing a pitch control quantity corresponding in sense to the direction of movement of the aircraft about the pitch axis; means for utilizing said yaw, roll and pitch control quantities, respectively, to control said aircraft about the yaw, roll and pitch axes thereof; means for controlling the turn gyroscope in dependence of the roll control quantity, means for controlling the roll gyroscope in dependence of the yaw control quantity, and means for applying a unidirectional control to the pitch gyroscope in dependence of the roll control quantity irrespective of the sense of the roll control quantity.

88. In a system for controlling an aircraft about the yaw, roll and pitch axes thereof, the combination of, a turn gyroscope responsive to movement about the yaw axis, for producing a yaw control quantity corresponding in sense to the direction of movement of the aircraft about the yaw axis; a roll gyroscope responsive to movement about the pitch axis, for producing a roll control quantity corresponding in sense to the direction of movement of the aircraft about the roll axis; a pitch gyroscope responsive to movement about the pitch axis, for producing a pitch control quantity corresponding in sense to the direction of movement of the aircraft about the pitch axis; means for utilizing said yaw, roll and pitch control quantities, respectively, to control said aircraft about the yaw, roll and pitch axes thereof; means for controlling the turn gyroscope in dependence of the roll control quantity, means for controlling the turn gyroscope in dependence of the angular deviation of said aircraft from a predetermined heading, means for controlling the roll gyroscope in dependence of the yaw control quantity, means for controlling the roll gyroscope in dependence of the angular position of said aircraft about said roll axis with respect to the equilibrium position thereof, means for controlling the pitch gyroscope as a function of the rate of change of elevation of said aircraft, and means for applying a unidirectional control to said pitch gyroscope in dependence of one of the yaw and roll control quantities irrespective of the sense thereof.

89. Apparatus for effecting coordinated turns of an aircraft having freedom of movement about a roll axis, a turn axis and a pitch axis comprising, in combination, a turn gyroscope, a roll gyroscope and a pitch gyroscope, one for each of said axes of freedom of the aircraft, means mounting each gyroscope on the aircraft with respect to the corresponding axis of freedom thereof so that each gyroscope is responsive to the velocity of angular movement of the aircraft about the corresponding axis of freedom and produces a torque about the output axis thereof in response to the velocity of said angular movement, control means for biasing said gyroscopes about the output axis thereof, manually operated means for operating said control means, and means for delaying the response of the control means associated with the turn gyroscope upon operation of said manually operated means.

90. Apparatus for effecting coordinated turning movement of an aircraft having freedom of movement about a turn axis, a roll axis and a pitch axis comprising, in combination, turn rate gyroscope means for producing a turn signal, roll rate gyroscope means for producing a roll signal, and pitch rate gyroscope means for producing a pitch signal, means responsive to each of said signals for controlling said aircraft, respectively, about said turn axis, said roll axis and said pitch axis; and means for suppressing said turn signal substantially proportionally to said roll signal.

91. Apparatus for effecting coordinated turning movement of an aircraft having freedom of movement about a turn axis, a roll axis and a pitch axis comprising, in combination, means for producing a turn signal, means responsive to said turn signal for producing a roll signal, means responsive to said roll signal for producing a pitch signal, means responsive to each of said signals, respectively, for controlling said aircraft about said turn, roll and pitch axes; means for reducing the roll signal as the bank angle of said aircraft increases, and means responsive to said roll signal for suppressing said turn signal.

92. In a system of control for an aircraft having rudder means, aileron means and elevator means, the combination of, turn control means for controlling said rudder means, roll control means for controlling said aileron means and pitch control means for controlling said elevator means; means for initiating operation of said turn control means and said pitch control means, means responsive to the velocity of operation of said turn control means for operating said roll control means, and means responsive to the operating position of said aileron means for opposing the operation of said pitch control means.

93. In a system of control for an aircraft having rudder means, aileron means and elevator means, the combination of, turn control means for controlling the rudder means, roll control means for controlling the aileron means and pitch control means for controlling the elevator means; means for initiating operation of said turn control means and said pitch control means, means responsive to the velocity of operation of said turn control means for operating said roll control means, and means operable as a function of the velocity of operation of said turn control means for opposing the operation of said pitch control means.

94. In a system of control for an aircraft having rudder means, aileron means and elevator means, the combination of, turn control means for controlling the rudder means, roll control means for controlling the aileron means and pitch control means for controlling the elevator means; means for initiating operation of said turn control means and said pitch control means, means responsive to the velocity of operation of said turn control means for operating said roll control means, and means responsive to the velocity of operation of said turn control means for opposing the operation of said pitch control means.

95. In a system for controlling an aircraft having rudder means, aileron means and elevator means, the combination of, a turn gyroscope, a bank gyroscope and a pitch gyroscope, means securing each of said gyroscopes to said aircraft to respond, respectively, to the velocity of angular motion of the aircraft about the turn, bank and pitch axes thereof; a rudder servo system responsive to the output of the turn gyroscope for controlling the rudder means, an aileron servo system responsive to the output of the bank gyroscope for controlling the aileron means, an elevator servo system responsive to the output of the pitch gyroscope for controlling the elevator means, means responsive to the velocity of operation of the rudder servo system for controlling the bank gyroscope, and means responsive to the operating position of the aileron servo system for controlling the pitch gyroscope.

96. In a system for controlling the angular position of a body having freedom of movement about three mutually perpendicular axes, the combination of first, second and third rate gyroscopes, respectively disposed to respond to the velocity of angular motion of the body about first, second and third axes of freedom thereof; servo means for each axis of freedom, each responsive to the output of the corresponding one of the rate gyroscopes, for controlling the body about the corresponding axis; magnet means for each of the first, second and third rate gyroscopes for controlling the output of the corresponding rate gyroscopes; energizing means for the magnet means of each of the first, second and third rate gyroscopes, each responsive to the velocity of operation of the corresponding servo means; means responsive to the velocity of operation of the servo means associated with the first rate gyroscope, for energizing the magnet means of the second rate gyroscope; and means responsive to the operational position of the servo means associated with the second rate gyroscope for controlling the magnet means of the third rate gyroscope.

97. In a control for an aircraft having a rudder, ailerons and an elevator, the combination of, means for driving the rudder, aileron driving means responsive to the velocity of operation of the rudder for driving the ailerons, elevator driving means responsive to said means for driving the rudder and operable as a function of the square of the velocity of operation of the rudder driving means for driving the elevator and means for manually controlling said means for driving the rudder and said elevator driving means.

98. In a control for an aircraft having a rudder, ailerons and an elevator, the combination of, rudder driving means, aileron driving means, and elevator driving means, piloting means for operating the rudder driving means and the elevator driving means, means responsive to the velocity of operation of the rudder for controlling the aileron driving means, and means operable as a function of the velocity of operation of the rudder for opposing the operation of said elevator driving means as effected by said piloting means.

99. In a control for an aircraft having a rudder, ailerons and an elevator, the combination of, means for driving the rudder, means operable as a linear function of the velocity of operation of the rudder for driving the ailerons, and means operable as a function of the square of the velocity of operation of said rudder for driving the elevator.

100. In a control for an aircraft having a rudder, ailerons and an elevator, the combination of, means for driving the rudder, piloting means for controlling the means for driving the rudder, means operable as a function of the velocity of operation of the rudder for driving the ailerons, and means operable in dependence of the square of the difference of a function of rudder velocity and a function of the position of said piloting means for driving said elevator.

101. In a control for an aircraft having a rudder, ailerons and an elevator, the combination of, means for driving the rudder, piloting means for controlling the means for driving the rudder, means responsive to the velocity of operation of the rudder for driving the ailerons, and means responsive to the square of the difference of the velocity of operation of the rudder and the position of said piloting means for controlling said elevator.

102. In a control for an aircraft having a rudder, ailerons and an elevator, the combination of, rudder driving means, piloting means for controlling the rudder driving means, means responsive to the velocity of operation of the rudder for driving the ailerons, and means responsive to the square of the difference of the velocity of operation of the rudder and the position of said piloting means for controlling said elevator.

103. In a system of control for a motor having a rotor winding in which the motor is operable to control the angular position of a body about an axis, the combination of, means forming an electrical bridge circuit including said rotor winding as one leg, said bridge circuit being balanced when said rotor winding is stationary and being unbalanced in magnitude and direction depending upon the magnitude and direction of the back E. M. F. of said rotor winding during rotation, the bridge unbalance being indicative of the motor velocity, energizing means for said bridge circuit, regulating means responsive to angular movement of said body about said axis for controlling the electrical output of said energizing means, means responsive to the electrical output of said bridge circuit for controlling the regulating means, and means operable as a function of the rotational position of said motor to control said regulating means.

104. In a system of control for a motor having a rotor winding in which the motor is operable to control the angular position of a body about an axis, the combination of, means forming an electrical bridge circuit including said rotor winding as one leg, said bridge circuit being balanced when said rotor winding is stationary and being unbalanced in magnitude and direction depending upon the magnitude and direction of the back E. M. F. of said rotor winding during rotation, the bridge unbalance being indicative of the motor velocity, energizing means for said bridge circuit, regulating means responsive to angular movement of said body about said axis for controlling the electrical output of said energizing means, means responsive to the electrical output of said bridge circuit for controlling the regulating means, means operable as a function of the rotational position of said motor for controlling said regulating means, and means responsive to the angular position of said body with respect to a reference position for controlling said regulating means.

105. In a system of control for a motor having a rotor winding in which the motor is operable to control the angular position of a body about an axis, the combination of, means forming an electrical bridge circuit including said rotor winding as one leg, said bridge circuit being balanced when said rotor winding is stationary and being unbalanced in magnitude and direction depending upon the back E. M. F. of the rotor winding during rotation of the rotor winding, the electrical unbalance of the bridge circuit being indicative of the velocity of the rotation, a generator, having field winding means, for energizing said bridge circuit, velocity responsive means responsive to the velocity of angular movement of the body about said axis, for producing an electrical quantity in dependence of the velocity of angular movement of the body about said axis, for energizing said field winding means; and means for controlling the response of said velocity responsive means to angular movement of the body in dependence of the electrical output of said bridge circuit.

106. In a system of a control for a motor having a rotor winding in which the motor is operable to control the angular position of a body about an axis, the combination of, means forming an electrical bridge circuit including said rotor winding as one leg, said bridge circuit being balanced when said rotor winding is stationary and being unbalanced in magnitude and direction depending upon the back E. M. F. of the rotor winding during rotation of the rotor winding, the electrical unbalance of the bridge circuit being indicative of the velocity of the rotation, a generator, having field winding mean, for energizing said bridge circuit, velocity responsive means responsive to the velocity of angular movement of the body about said axis, for producing an electrical quantity in dependence of the velocity of angular movement of the body about said axis, for energizing said field winding means; means for controlling the response of said velocity responsive means to angular movement of the body in dependence of the electrical output of said bridge circuit, and means for controlling said response of said velocity responsive means in dependence of the rotational position of said motor.

107. In a system of control for a motor having a rotor winding in which the motor is operable to control the angular position of a body about an axis, the combination of, means forming an electrical bridge circuit including said rotor winding as one leg, said bridge circuit being balanced when said rotor winding is stationary and being unbalanced in magnitude and direction depending upon the back E. M. F. of the rotor winding during rotation of the rotor winding, the electrical unbalance of the bridge circuit being indicative of the velocity of the rotation, a generator, having field winding means, for energizing said bridge circuit, velocity responsive means responsive to the velocity of angular movement of the body about said axis, for producing an electrical quantity in dependence of the velocity of angular movement of the body about said axis, for energizing said field winding means; means for controlling the response of said velocity resposive means to angular movement of the body in dependence of the electrical output of said bridge circuit, means responsive to the rotational position of said motor for controlling said response of said velocity responsive means, and means for controlling the response of said velocity responsive means in dependence of the angular deviation of said body about said axis with respect to a reference angular position.

108. In a system of control for a motor having an armature winding and a field winding, the combination of, means for exciting the field winding, an electrical bridge circuit including the motor armature winding as one leg thereof, said electrical bridge circuit being balanced when said armature winding is stationary and being unbalanced by the change of impedance of the armature winding during rotation, a gyroscope having freedom of movement about the precession axis thereof, means for energizing the bridge circuit in dependence of precessional movement of the gyroscope, and means responsive to the unbalance of the bridge circuit for biasing said gyroscope about the precession axis thereof.

109. In a system of control for a motor having an armature winding and a field winding, the combination of, means for exciting the field winding, an electrical bridge circuit including the motor armature winding as one leg thereof, said electrical bridge circuit being balanced when said armature winding is stationary and being unbalanced by the change of impedance of the armature winding during rotation, a gyroscope having freedom of movement about the precession axis thereof, means for reenergizing the bridge circuit in dependence of precessional movement of the gyroscope, means responsive to the unbalance of the bridge circuit for biasing said gyroscope about the precession axis thereof, and means for additionally biasing said gyroscope about the precession axis thereof as a function of the angular position of said motor.

110. A gyroscope assembly comprising, in combination, a rotor, gimbal means mounting said rotor for rotation about the spin axis thereof, bearing means forming a gimbal axis supporting said gimbal means for rotation about an axis normal to said spin axis, a stationary contact, a movable contact disposed to be operated by said gimbal means upon rotation thereof about said gimbal axis to and from positions engaging said stationary contact, said rotor having a non-uniform mass distribution axially thereof to produce a dynamic torque couple about said gimbal axis during rotor rotation.

111. A gyroscope assembly comprising, in combination, a rotor, gimbal means mounting said rotor for rotation about the spin axis thereof, bearing means forming a gimbal axis supporting said gimbal means for rotation about an axis normal to said spin axis, a stationary contact, a movable contact disposed to be operated by said gimbal means upon rotation thereof, to and from positions engaging said stationary contact, said rotor having a non-uniform mass distribution axially thereof to produce a predetermined dynamic torque couple about said gimbal axis during rotor rotation, and means including the stationary and movable contact for limiting movement about said gimbal axis.

112. A gyroscope assembly comprising, in combination, a rotor, gimbal means mounting said rotor for rotation about the spin axis thereof, bearing means forming a gimbal axis supporting said gimbal means for rotation about an axis normal to said spin axis, a stationary contact, a movable contact disposed to be operated by said gimbal means upon rotation thereof, to and from positions engaging said stationary contact, said rotor having a non-uniform mass distribution axially thereof to produce a predetermined dynamic torque couple about said gimbal axis during rotor rotation, means including the stationary and the movable contact for limiting movement about said gimbal axis, and means for introducing a predetermined torque about said gimbal axis for modifying the engagement pressure of the movable contact with the stationary contact.

113. A gyroscope assembly comprising, in combination, a rotor, gimbal means mounting said rotor for rotation about the spin axis thereof, bearing means forming a gimbal axis supporting said gimbal means for rotation about an axis normal to said spin axis, a stationary contact, a movable contact disposed to be operated by said gimbal means upon rotation thereof, to and from positions engaging said stationary contact, said rotor having a non-uniform mass distribution axially thereof to produce a predetermined dynamic torque couple about said gimbal axis during rotor rotation, means including the stationary and the movable contact for limiting movement about said gimbal axis, a stationary electromagnet, and an armature therefor connected with said gimbal means.

114. A gyroscope assembly comprising, in combination, a rotor, gimbal means mounting said rotor for rotation about the spin axis thereof, bearing means forming a gimbal axis supporting said gimbal means for rotation about an axis normal to said spin axis, a stationary contact, a movable contact disposed to be operated by said gimbal means upon rotation thereof, to and from positions engaging said stationary contact, said rotor having a non-uniform mass distribution axially thereof to produce a predetermined dynamic torque couple about said gimbal axis during rotor rotation, means including the stationary contact and the movable contact for limiting movement about said gimbal axis, an electromagnet including a coil and a core, an armature of the form of a sleeve encompassing said core in spaced relation therewith adjacent an extremity of said coil, and means connecting said armature with said gimbal means.

115. A gyroscope assembly comprising, in combination, a rotor, gimbal means mounting said rotor for rotation about the spin axis thereof, bearing means forming a gimbal axis supporting said gimbal means for rotation about an axis normal to said spin axis, a stationary contact, a movable contact disposed to be operated by said gimbal means upon rotation thereof, to and from positions engaging said stationary contact, said rotor having a non-uniform mass distribution axially thereof to produce a predetermined dynamic torque couple about said gimbal axis during rotor rotation, means including the stationary contact and the movable contact for limiting movement about said gimbal axis, a pair of electromagnets, each including a coil and a core and having the cores disposed with an extremity of one confronting the other to form an airgap therebetween circumferentially of the gimbal axis; an armature member of the form of a sleeve encompassing said cores at said airgap, and means connecting said armature member with said gimbal means.

116. In combination, a gyroscope having a rotor, gimbal means mounting said rotor for rotation about the spin axis thereof, bearing means mounting said gimbal means for rotation about an axis normal to said spin axis, means mounting said bearing means for effecting rotation of said gimbal means and rotor normal to the axis of said gimbal means and substantially normal to said spin axis, electrical means responsive to gyroscopic torques about said gimbal axis for producing an electrical current, said rotor having a non-uniform mass distribution axially thereof to produce dynamic torque couples about said gimbal axis during rotor rotation, the magnitude of said unbalance being such as to cause large changes in current of said electrical means for small changes in torque about said gimbal axis due to said rotor unbalance, and means responsive to said electrical current for biasing said gyroscope about said gimbal axis to reduce the current-torque ratio of said gyroscope.

117. In a device responsive to a physical quantity, the combination of, an electrical coil, a core disposed within said coil and having one extremity thereof projecting beyond the end of said coil, an armature member encompassing the projecting extremity of said core, means mounting said armature member for movement along the projecting extremity of said core, means responsive to said physical quantity for biasing said armature member in a direction along said core away from said coil, variable current conducting means controlled by said armature member, said variable current conducting means passing more current as said armature member is moved away from said coil along said core and passing less current upon movement of said armature member along said core towards said coil, and circuit means connecting said coil with said variable current conducting means.

118. In a device responsive to a physical quantity, the combination of, electrical coil means, a core disposed with respect to said electrical coil means to be linked by the magnetic flux thereof, an armature member, means movably mounting said armature member adjacent said core for motion towards and away from said electrical coil means so that an air gap of substantially constant magnetic characteristic is formed between the armature member and the core whether the armature member is moving or stationary, variable impedance means controlled by said armature member, the impedance of said variable impedance means being decreased upon motion of said armature member away from said electrical coil means and the impedance being increased upon motion of said armature member towards said electrical coil means, means responsive to said physical quantity for biasing said armature member away from said electrical coil means, and circuit means connecting said electrical coil means with said variable impedance means.

119. In a device responsive to a physical quantity, the combination of, an electrical coil, a cylindrical core disposed within said coil and having one extremity projecting beyond the coil, an armature member of the form of an annulus encircling the projecting extremity of said core, means movably mounting said armature for motion along said core, contact means responsive to movement of said armature member, said contact means being closed upon movement of said armature member away from said coil and being opened upon movement of said armature member towards said coil, means responsive to said physical quantity for closing said contact means, and circuit means connecting said electrical coil with said contact means to be energized upon closure of said contact means.

120. Gyroscopic apparatus for detecting rates of movement of a body about three substantially mutually perpendicular axes of freedom comprising, a support adapted for mounting on said body in a predetermined position, three gyroscope rotors, a frame for each gyroscope rotor rotatably mounting the corresponding gyroscope rotor about its spin axis, mounting means for each frame pivotally mounting each frame on said support for movement about a pivot axis substantially at right angles to the spin axis of the rotor in that frame, each mounting means orienting the spin axis and the pivot axis of the associated rotor and frame in a position on said support which is substantially at right angles to the corresponding axis of freedom of the body, and electromagnetic biasing means connected with each frame for applying torques about the pivot axis thereof.

121. Gyroscopic apparatus for detecting rates of movement of a body about three substantially mutually perpendicular axes of freedom comprising, a support adapted for mounting on said body in a predetermined position, three gyroscope rotors, a frame for each gyroscope rotor rotatably mounting the corresponding gyroscope rotor about its spin axis, mounting means for each frame pivotally mounting each frame on said support for movement about a pivot axis substantially at right angles to the spin axis of the rotor in that frame, each mounting means orienting the spin axis and the pivot axis of the associated rotor and frame in a position on said support which is substantially at right angles to the corresponding axis of freedom of the body, three electromagnets stationarily secured to said support, an armature for each electromagnet, and means securing the armature members, respectively, to the respective frames for movement about the corresponding pivot axis.

122. In a system for controlling a body about one of its axes of freedom, said body having operating means for effecting motion about said one axis, the combination of, a gyroscope supported on said body for precessional movement about the precessional axis of the gyroscope in dependence of the velocity of angular movement of the body about said one axis, stop means for limiting the precessional movement of the gyroscope, control means responsive to precessional movement of the gyroscope for controlling said operating means, biasing means responsive to the operating position of said operating means for controlling the precessional movement of said gyroscope about the precessional axis thereof, and biasing means for controlling the precessional movement of the gyroscope about the precession axis thereof in dependence of the angular position of the body with respect to a predetermined reference position.

123. In a system for controlling a moving craft about one of its axes of freedom, said craft having operating means for effecting motion about said one axis, the combination of, a gyroscope supported on said craft for precessional movement about the precession axis thereof in dependence of the velocity of angular movement of the craft about said one axis of freedom, control means operatively connected to said gyroscope to respond to precessional movement of the gyroscope for controlling said operating means, biasing means responsive to movement of said operating means and operatively connected to said gyroscope to control precessional movement of said gyroscope, and means responsive to the error in direction of movement of said craft with respect to a predetermined direction for controlling said biasing means.

124. A stabilizer system for controlling a craft about one axis of freedom comprising, a gyroscope having a rotor and a gimbal frame rotatably mounting the rotor, bearing means on the gimbal frame defining a bearing axis at right angles to the rotor axis, bearing support means for said bearing means for positioning said gyroscope with the rotor axis substantially perpendicular to a plane including said one axis of freedom, biasing means for applying torques about the bearing axis of said gyroscope, servo means responsive to movement of said gyroscope about said bearing axis for controlling said craft about said one axis, and means connected to and responsive to operation of said servo means and connected to said biasing means for controlling said biasing means.

CLINTON R. HANNA.

References Cited in the file of this patent

UNITED STATES PATENTS

| Number | Name | Date |
|---|---|---|
| 363,184 | Thomson | May 17, 1887 |
| 1,501,886 | Abbot | July 15, 1924 |
| 1,726,192 | Richardson | Aug. 27, 1929 |
| 1,869,840 | Boykow | Aug. 2, 1932 |
| 1,958,258 | Alexanderson | May 8, 1934 |
| 1,966,170 | Greene | July 10, 1934 |
| 1,973,042 | Boykow | Sept. 11, 1934 |
| 2,078,729 | Lemoine | Apr. 27, 1937 |
| 2,137,974 | Fischel | Nov. 22, 1938 |
| 2,256,875 | Wade | Sept. 23, 1941 |
| 2,263,497 | Harrison | Nov. 18, 1941 |
| 2,274,443 | Fischer | Feb. 24, 1942 |
| 2,349,287 | Krussmann | May 23, 1944 |
| 2,383,409 | Newell | Aug. 21, 1945 |
| 2,385,203 | Hanna et al. | Sept. 18, 1945 |
| 2,401,168 | Kronenberger | May 28, 1946 |
| 2,412,204 | Carter et al. | Dec. 10, 1946 |
| 2,423,337 | Moseley | July 1, 1947 |
| 2,427,549 | Carlson | Sept. 16, 1947 |
| 2,429,257 | Bond | Oct. 21, 1947 |
| 2,439,750 | Nisbet et al. | Apr. 13, 1948 |
| 2,452,311 | Markusen | Oct. 26, 1948 |
| 2,516,641 | Murphy | July 25, 1950 |
| 2,590,020 | Kutzler et al. | Mar. 18, 1952 |

FOREIGN PATENTS

| Number | Country | Date |
|---|---|---|
| 621,121 | Great Britain | Apr. 5, 1949 |